(12) United States Patent
Peraud et al.

(10) Patent No.: US 12,288,140 B2
(45) Date of Patent: Apr. 29, 2025

(54) CLASSIFIER ASSISTANCE USING DOMAIN-TRAINED EMBEDDING

(71) Applicant: Microsoft Technology Licensing, LLC, Redmond, WA (US)

(72) Inventors: Soyoung Peraud, Redmond, WA (US); Alexandre Rochette, Montreal (CA); Gabriel Arien Desgarennes, Issaquah, WA (US); Niel Chah, Toronto (CA); Abhishek Kumar, Redmond, WA (US); Timothy James Hazen, Arlington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1142 days.

(21) Appl. No.: 17/150,524

(22) Filed: Jan. 15, 2021

(65) Prior Publication Data

US 2022/0230089 A1    Jul. 21, 2022

(51) Int. Cl.
| | |
|---|---|
| *G06N 3/09* | (2023.01) |
| *G06F 18/22* | (2023.01) |
| *G06F 18/23* | (2023.01) |
| *G06F 18/2411* | (2023.01) |
| *G06F 18/2431* | (2023.01) |
| *G06N 3/084* | (2023.01) |
| *G06N 20/00* | (2019.01) |

(52) U.S. Cl.
CPC .............. *G06N 20/00* (2019.01); *G06F 18/22* (2023.01); *G06F 18/23* (2023.01); *G06F 18/2411* (2023.01); *G06F 18/2431* (2023.01); *G06N 3/084* (2013.01); *G06N 3/09* (2023.01)

(58) Field of Classification Search
CPC .......... G06N 20/00; G06N 3/084; G06N 3/09; G06N 3/082; G06F 18/22; G06F 18/23; G06F 18/2411; G06F 18/2431; G06F 40/30
See application file for complete search history.

(56) References Cited

U.S. PATENT DOCUMENTS

| | | | |
|---|---|---|---|
| 2009/0150436 A1 | 6/2009 | Godbole et al. | |
| 2019/0019061 A1* | 1/2019 | Trenholm | ........... G06F 18/2411 |
| (Continued) | | | |

OTHER PUBLICATIONS

"International Search Report and Written Opinion Issued in PCT Application No. PCT/US21/061698", Mailed Date: Feb. 28, 2022, 10 Pages.

*Primary Examiner* — Sanchita Roy
(74) *Attorney, Agent, or Firm* — Rainier Patents, P.S.

(57) ABSTRACT

A classifier may be trained with less than all datasets manually annotated with labels. A small subset of verbatims may be manually labeled with topic labels as seeds. Data augmentations can be used to acquire seed verbatim sets for known topics and to assign temporary pseudo labels to the rest of the verbatims based on their vector space proximity to the labeled seed verbatims. The training may involve classification epochs during which embeddings are updated with the assumption that the pseudo labels are ground-truth labels. The training may also involve labeling epochs during which the updated embeddings are used to update the vectors corresponding to the verbatims, and pseudo labels are updated based on updated vector coordinates in the vector space. As the training process progresses through the epochs, the embeddings will converge.

20 Claims, 10 Drawing Sheets

(56) References Cited

U.S. PATENT DOCUMENTS

2019/0180175 A1* 6/2019 Meteer .................... G10L 15/26
2020/0279105 A1* 9/2020 Muffat .................... G06N 3/08
2021/0256220 A1* 8/2021 Kaur ...................... G06N 20/00
2022/0083739 A1* 3/2022 Magnusson ............ G06N 3/088

* cited by examiner

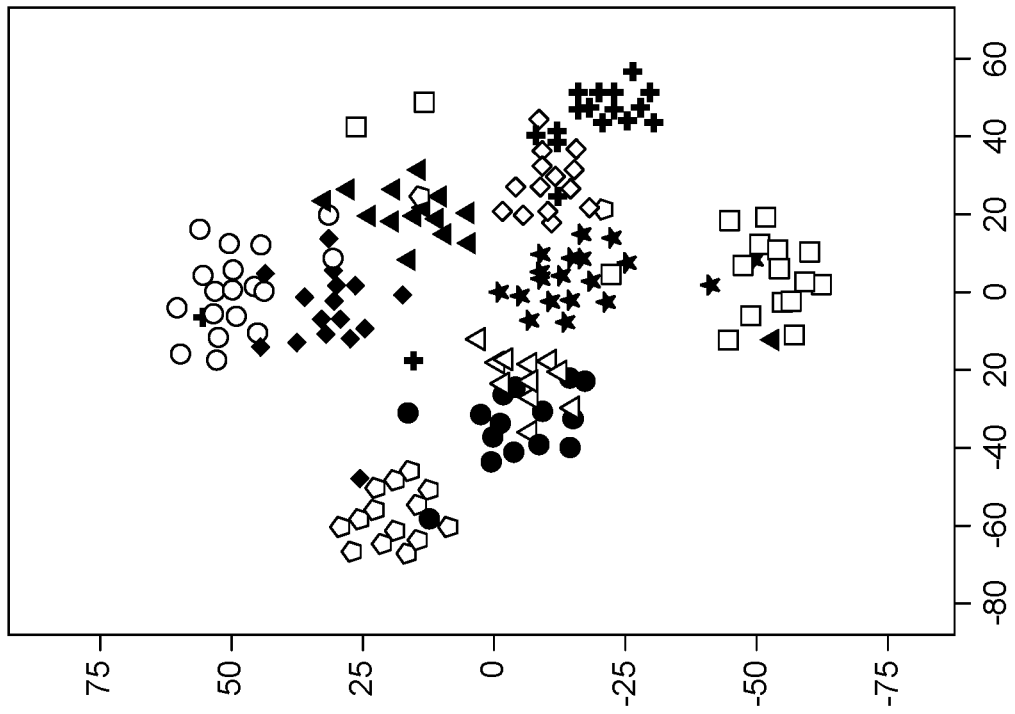
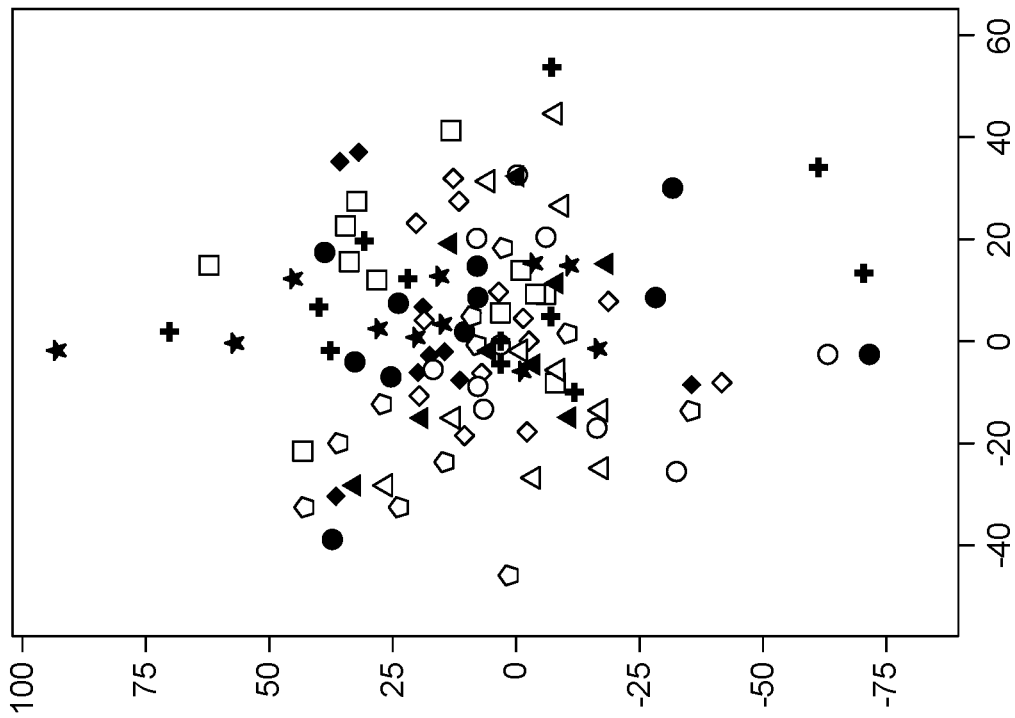
FIG. 3B
FIG. 3A

| Verbatim | cant sing in to a game | I'm online and it won't let me sign into my Xbox live connected account, it strictly won't let me use it online and offline it doesn't work most of the time as well, my internet is a strict Nat but this has never been a problem before. I've reset my Xbox, I've reset my router, I've deleted then re-added my account, and every other option I have been given by you guys and each time I get a different error message. (I.e. 0x87DD0017, and several others) I've waited a whole day and it didn't fix itself. PLEASE help my and let me talk to a real person who knows how to fix this | Can this page contain steps how to change your password and not just where and where we cannot change it? | I have unauthorize charges on my card and i cant get in tough with any one stop it and its fraud stealing someones money is totally unacceptable | When i try to use my email to sign into xbox live i dont get an email to verrify and it has the wrong password |
|---|---|---|---|---|---|
| Ranking1 (Distance) | Sign on issue (0.469725) | Phone Call Request (0.714959) | Password (0.28253) | Reports (0.82296) | Password (0.2540) |
| Ranking2 (Distance) | Can't play game (0.864936) | Contact Request (0.89117) | Sign on issue (1.0665) | Payment (0.82414) | Sign on issue (0.99114) |
| Ranking3 (Distance) | Subscription Issue (1.06850) | Computer Hardware (1.050091) | Payment (1.09951) | Contact Request (0.8911) | Account (1.0231) |
| Ranking4 (Distance) | Computer Hardware (1.09847) | Error Codes (1.10823) | Profile (1.15207) | Account (1.04762) | Payment (1.0499) |
| Ranking5 (Distance) | Error Codes (1.1845) | Sign on issue (1.17775) | Account (1.1573) | Subscription Issue (1.0854) | Profile (1.1793) |

FIG. 5

| Verbatim | I'm online and it won't let me sign into my Xbox live connected account, it strictly won't let me use it online and offline it doesn't work most of the time as well, my internet is a strict Nat but this has never been a problem before. I've reset my Xbox, I've reset my router, I've deleted then re-added my account, and every other option I have been given by you guys and each time I get a different error message. (I.e. 0x87DD0017, and several others) I've waited a whole day and it didn't fix itself. PLEASE help my and let me talk to a real person who knows how to fix this | [Cut off sentence 1]<br><br>I'm online and it won't let me sign into my Xbox live connected account, it strictly won't let me use it online and offline it doesn't work most of the time as well, my internet is a strict Nat but this has never been a problem before. | [Cut off sentence 2]<br><br>I've reset by Xbox, I've reset my router, I've deleted then re-added my account, and every other option I have been given by you guys and each time I get a different error message. | [Cut off sentences 3 & 4]<br><br>I've waited a whole day and it didn't fix itself. PLEASE help my and let me talk to a real person who knows how to fix this |
|---|---|---|---|---|
| Ranking1 (Distance) | Phone Call Request (0.714959) | Computer Hardware (0.60805) | Device (0.941523) | Contact Request (0.370531) |
| Ranking2 (Distance) | Contact Request (0.89117) | Sign on issue (0.7894) | Error Codes (0.94846) | Phone Call Request (0.6518) |
| Ranking3 (Distance) | Computer Hardware (1.050091) | Can't play game (1.0500) | Sign on issue (1.08280) | Did not resolve (1.1599) |
| Ranking4 (Distance) | Error Codes (1.10823) | Account (1.05056) | Can't play game (1.0966) | Computer Hardware (1.1794) |
| Ranking5 (Distance) | Sign on issue (1.17775) | Subscription Issue (1.11353) | Computer Hardware (1.1867) | Didn't help (1.1886) |

FIG. 8

CLASSIFIER ASSISTANCE USING DOMAIN-TRAINED EMBEDDING

BACKGROUND

A classifier may be an important tool having a wide array of useful applications. However, training a machine learning model that can accurately classify datasets into classes with minimal human intervention can be challenging.

SUMMARY

The present concepts relate to classifying datasets into classifications. For example, datasets can include natural language text, called verbatims, that can be classified by their relevant topics. The present concepts may leverage a variety of sources, such as different services and tools, to quickly identify and reveal trending topics. In one example application, the present concepts may assist a gaming provider to have empathy for its customer by providing insight into customer feedback.

However, it may be difficult to efficiently extract actionable insight from customer feedback. There are several problems with classifying natural language text. Existing tools may not be trained on the specific domain language, and as such, may struggle to extract insight from domain-specific natural language text. For instance, if existing natural language processing tools are not trained using gamer-specific domain language, then such tools may not be proficient in processing gamer-specific feedback.

Furthermore, conventional tools may require a significant amount of manual labor by humans. Such tools may force substantial human intervention to select which data will be investigated. Moreover, existing tools may not be suitable for tracking the growth and shrinkage of known topics, and thus may be inefficient in accurately identifying emerging issues by detecting new topics.

Additionally, conventional topic classifiers often struggle due to multiple class assignments and subjectivity. Therefore, the establishment of a proper taxonomy with fast emerging topics using conventional topic classifiers can be ineffective and time consuming, requiring significant human annotations. That is, manual human annotations required to reach desired levels of objectivity and accuracy can be very time consuming and challenging especially with new emerging topics.

The present concepts may train a model that can provide two types of insights from verbatims containing natural language feedback from users. First, the model can identify one or more known topics relevant to a verbatim. Second, the model can identify verbatims that do not pertain to any known topics and thus can help identify new emerging topics. Moreover, the model does not require the training set of verbatims to be fully annotated to obtain a classifier and to provide these two types of insights.

In some implementations, the present concepts may utilize a base natural language model. The base natural language model may be fine-tuned using relevant domain language. Then, the present concepts may train a classifier in two stages—supervised learning in the first stage and unsupervised learning in the second stage, as discussed more below.

Regarding the first type of insights, a taxonomy of known topics may be defined by a human, for example, a subject matter expert (SME). Example topics may include, for example: a user desires a refund, a user is experiencing connectivity issues, a user cannot sign in, etc.

Consistent with the present concepts, the first stage of supervised learning may involve using a conventional classifier to learn to classify verbatims that were manually annotated by SMEs. Additionally, the classifier may be trained to classify verbatims that have not been manually annotated. If a verbatim is of a known topic or of multiple known topics, then the verbatim may be assigned to one or more known topics. Typically, in practice, a single verbatim may relate to multiple topics.

Regarding the second type of insights, the second stage of unsupervised learning may use clustering techniques. If verbatims are not of a known topic, then such verbatims can be clustered, for example, based on semantic similarities. The clustered verbatims may be evaluated by SMEs to decide whether these verbatims include a new topic that is worthy of tracking in the future. If so, then the new topic may be assigned to the relevant verbatims, and the new topic may be added to the taxonomy of known topics. Moving forward, the model may be trained to classify new verbatims relating to the new topic.

The present concepts may involve a joint optimization of the two modes: (1) semi-supervised learning for the known topics and (2) unsupervised learning for the unknown topics. Rather than creating two different models or representations for the two modes, the present concepts can create a joint modeling of both modes together.

BRIEF DESCRIPTION OF THE DRAWINGS

The Detailed Description below is described with reference to the accompanying figures. The use of similar reference numbers in different instances in the description and the figures may indicate similar or identical items.

FIGS. 3A and 3B illustrate example updating of embeddings and pseudo labels through training epochs, consistent with some implementations of the present concepts.

FIG. 5 illustrates example verbatims and candidate topic classifications, consistent with some implementations of the present concepts.

FIG. 8 illustrates an example long verbatim separated into multiple shorter verbatims, consistent with some implementations of the present concepts.

DETAILED DESCRIPTION

The present concepts relate to training and using a machine learning model that can classify datasets into classifications. In one example application, the model may classify natural language user feedback by topic classifications. For example, a game developer may receive customer feedback and may want to ascertain intelligible and/or actionable insights from the customer feedback to improve products and services.

The present concepts may create a model that:
Jointly trains a single representation that allows both classification and clustering, which share the same class as classification task to work effectively.
Is able to classify short free-form texts, which represent classes, without full annotation.
Leverages unsupervised examples to enhance classification performance.
Is able to classify a verbatim into one or more classes simultaneously.
Easily extends the classes that the model can output (i.e., an output schema) without necessarily retraining of the model.
Uses the model's representation for clustering verbatims that do not belong to any existing class by distance criteria.
Implements fixed clustering using differentiated loss functions to support the classification step more effectively to guide the subsequent clustering assignments and share important features to achieve optimization.

Figure 1:
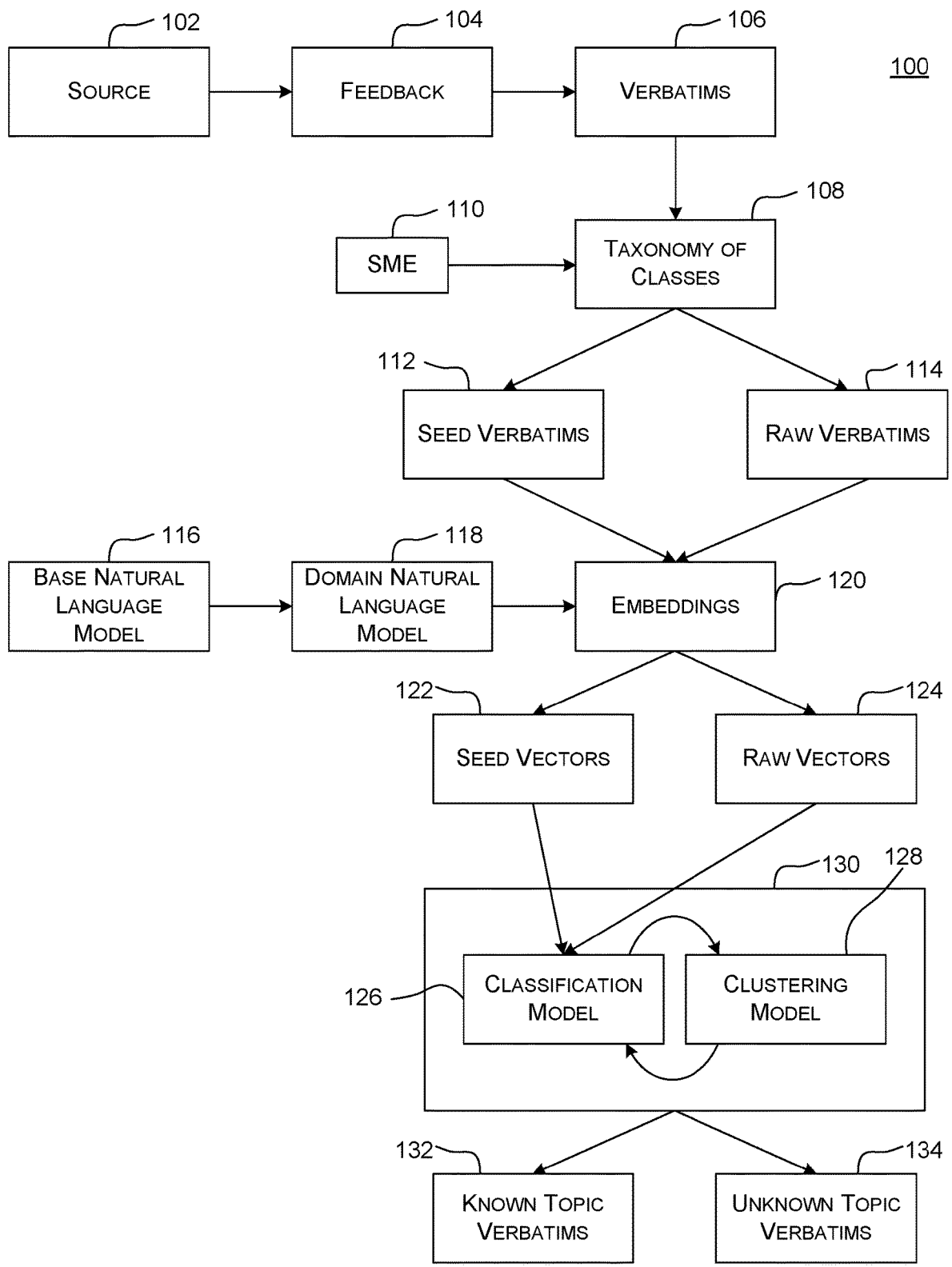
FIG. 1 illustrates an example training workflow for training a machine learning model, consistent with some implementations of the present concepts.

FIG. 1 illustrates an example training workflow 100 for training a machine learning model, consistent with some implementations of the present concepts. Sources 102 may provide feedback 104 from users or customers. The sources 102 may include any product, service, forum, bug reports, reviews, social media, platform, or channel through which a user can input or provide the feedback 104. The sources 102 may include, for example, surveys completed by users, polls, questionnaires, social media posts, chat messages, a contact us page, reviews, specific game products, logs, books, webpages, blogs, etc.

The feedback 104 may include any content, such as general discussions, complaints, problems, emotions, etc. The feedback 104 may be in any form, such as text, audio, video, image, or any other form that may be converted to discernible text. For instance, a game developer may collect millions of feedback 104 from customers across multiple sources 102, such as multiple game products. The game developer may want to leverage the feedback 104 to improve the quality of service or change the design of its game products for future releases.

The feedback 104 received from the source 102 may be converted or transformed, if necessary, into the form of a document containing the text of the feedback 104, which may be called a verbatim 106. Thus, the verbatim 106 may be a string representation of the feedback 104. The verbatim 106 may be unstructured or semi-structured (i.e., a mix of free-form text data and structured attributes). In other implementations, the verbatims 106 need not be sourced from human users but rather from machine-generated text.

In some implementations, the feedback 104 and/or the verbatim 106 may be translated from one language to another. For example, non-English verbatims or non-English portions of verbatims may be translated into the English language. In some implementations, personal identifiable information (PII), such as gamer tags or internet protocol (IP) addresses, may be scrubbed from feedback 104 and/or the verbatim 106. PII may be scrubbed, for example, for privacy purposes. In some implementations, the verbatim 106 may be shortened, truncated, snipped, or summarized to convert verbose text into concise consumable text. In some implementations, verbatims 106 from multiple disparate sources 102 may be processed into a common schema.

These example techniques of processing of feedback 104 from sources 102 may generate verbatims 106 that can be processed by a machine learning model consistent with the present concepts.

The present concepts can assist in understanding and gaining insight into the verbatims 106, for example, helping a gaming provider to have empathy for its customers. Because it is impracticable for humans to manually read a large volume of verbatims 106, the present concepts may use a variety of text clustering or topic modeling tools in order to extract insight from the verbatims 106. Thus, the present concepts may reduce the amount of manual work required to extract actionable insight from the verbatims 106.

Consistent with the present concepts, a taxonomy of classes 108 may be defined by a human, such as an SME 110. For example, the taxonomy of classes 108 (or classifications) may include a set of topics (also called reference topics or known topics), a set of classification labels corresponding to the set of reference topics, and one or more example verbatims (also called seed verbatims 112) belonging to certain ones of the set of reference topics. The set of reference topics may represent the classes that are output by the machine learning model during run time.

A reference topic may refer to a representation of a user intent, such as a request, complaint, problem, praise, demand, etc. A reference topic may be represented by a name or a title that represents a cluster of intents found in verbatims 106. Examples of a reference topic may include "I need to speak with an agent," "I'm having issues launching the game due to privacy settings" (or simply "privacy"), "login issue," "network problem," "refund request," etc.

A topic may be of any granularity. For example, a broad reference topic (such as "privacy") may contain any verbatim relating to, dealing with, or referencing privacy in any capacity, whereas a more granular reference topic (such as "I'm having issues launching Minecraft™ due to privacy settings") may contain verbatims specifically relating to a narrower reference topic. In some implementations, the machine learning model may initially contain mostly higher-level topics, and then, over time, more granular topics may be added, for example, based on business needs or based on the received feedback.

A reference topic may be directional with sentiment (i.e., contain sentiment), or a reference topic may contain no sentiment. If a reference topic has sentiment, then verbatims belonging to that reference topic class may have sentiment.

Consistent with the present concepts, one or more seed verbatims 112 may be labeled and included in the set of reference topics. The seed verbatims 112 may be representations of how users may express the reference topic. In some implementations, the SME 110 may manually create seed verbatims 112 or use a few section annotations (if these section annotated verbatim parts do not include other topics) to be included in the various topic classes. That is, one verbatim may be split into sections of annotations that are mutually exclusive with respect to topics. For example, a verbatim may be "I am contacting customer service now to talk about my refund status." This verbatim may be split into two section annotations. One section annotation may be "I am contacting customer service now" relating to the "customer service" topic, and another section annotation may be "to talk about my refund status" relating to the "refund" topic. Therefore, the sections are like the concept of seed verbatims that are targeted to be mutually exclusive from each other with respect to their topics. Furthermore, the SME 110 may compose editorial examples that express a reference topic and use the editorial examples as the seed verbatims 112 for the reference topic. In other implementations, the SME 110 may manually select example verbatims from the available set of verbatims received from users to serve as seed verbatims 112 for specific topic classes and possibly serve as section annotations if the example verbatims contain multiple topic items.

For example, in one example implementation, the SME 110 may define the taxonomy of topic classifications 108 by reviewing select samples of the available verbatims 106, identifying important and recurring topics that reoccur in the samples, defining the important reference topics that the machine learning model should classify, and identifying a number of seed verbatims 112 for each of the reference topics. If there is a particular reference topic that the SME 110 would like that machine learning model to classify but has not found any or a sufficient number of example verbatims for that particular reference topic among the available verbatims 106, then the SME 110 may manually compose one or more seed verbatims 112 for that reference topic. To help with data augmentation, explained below, the seed verbatims 112 may be generic examples of the reference topics (i.e., each seed verbatim 112 relates to one topic and does not pertain to other topics).

Examples of seed verbatims for an example topic "Please call me" may include:
  "I just need someone to please call me to help resolve the problem I'm having with my account. Please. My number is {PhonePII}."
  "Somebody call me on {PhonePII} so I can speak to an actual person and get this resolved!"
  "Please call me now."
  "I BEG YOU to forward my number {PhonePII} to anyone who can help me ive already been scammed its impossible to get a hold of someone on the phone."
  "Please call so this can be resolved."
  "Need someone to give me a call back through live support."

Examples of seed verbatims for an example topic "Not working/Not able to play games" may include:
  "xbox fifa doesn't start"
  "doesn't allow me to play minecraft"
  "Games are not downloading it said it was starting then it stopped"
  "I checked xbox live and I couldn't find the issue but it won't let me play online"
  "CANT PLAY GAMES!!!"
  "My game is not downloading so I can't play"
  "Still trying to ply games on my live acount"

Examples of seed verbatims for an example topic "Payment/charge issue" may include:
  "stop charging me"
  "I cant redeem the code i paid for"
  "I bought a year xbox live card and I don't know why the card ran out"
  "Can a roblox gift card be available on xbox live? I still have 10 $ remaining"
  "You are only interested in taking my money"
  "I want to change my payment settings including my credit card number"
  "I want to cancel the charge"

As shown by the above examples, the set of known topics that may be assigned to verbatims may be pre-defined. Each known topic may include one or more seed verbatims 112. In one implementation, each reference topic may be unique (i.e., no overlap or hierarchical scope among the multiple reference topics). The number of seed verbatims 112 with known topics in relation to the number of raw verbatims whose topics are to be determined may be small (e.g., less than 5%) and adjusted based on observed effectiveness of the model. A higher number of seed verbatims 112 that are generalized (i.e., relate to only one topic each) may help avoid overfitting.

Consistent with the present concepts, a reference topic may be persistent and dynamic in nature. That is, a customer intent may be represented as a persistent topic that can be tracked over time. However, the collection of example verbatims that are associated with a reference topic may change over time as new expressions of that customer intent are added and bad expressions are removed from the reference topic classification.

The seed verbatims 112 may be labeled with the appropriate topics but the rest of the verbatims 106 need not be manually labeled with topics and may remain raw verbatims 114, which are not labeled. The seed verbatims 112 may be labeled with definite labels corresponding to the reference topics, and the definite labels may serve as ground-truth labels during classification tasks, explained below.

In practice, a verbatim 106 from a user may relate to multiple topics. In one implementation of the present concepts, the seed verbatims 112 may be mutually exclusive with respect to topics, meaning each seed verbatim 112 has only one definite label corresponding to only one topic. Thus, a seed verbatim 112 in one topic may not belong to another topic. Using seed verbatims 112 that belong to only one topic each can speed up the training process, whereas using seed verbatims having multiple topic assignments can decrease training efficiency. In this way, a group of seed verbatims that belongs to the same class may share the same or similar features, and thus the decision boundary is much clearer label-by-label.

In some implementations, an unknown topic class (also called a nontopic class or a dumpster class) may be created in addition to the known topic classes. The unknown class may act as a dumpster class (or a placeholder) for verbatims that do not belong to any of the known reference topics. The unknown class need not have any seed verbatim associated with it.

Example experiments using the present concepts were conducted in the context of gaming. In one experimental implementation of the present concepts, a taxonomy of 19 known topics were defined, each having 7 seed verbatims, resulting in a total of 133 seed verbatims that were labeled with topic class assignments. Each of the 133 seed verbatims was classified into only one topic. An unknown class was defined as well for a total of 20 classes.

The present concepts may involve developing a classifier having clustering rules that use the seeds verbatims 112 of the known topics as pivots around which the unlabeled raw verbatims 114 will be clustered. That is, the seed verbatims 112 can fix the clusters that may be formed by classification tasks performed by the machine learning model, which will be explained in detail below.

The machine learning model that classifies verbatims 106 by topic may receive feedback 104 from a particular group of users. That particular group of users may speak differently from the general population depending on the relevant domain. For example, gaming users in the gaming domain may speak differently than what typical conventional base language models are generally trained on. This can be due to a number of factors, including but not limited to, age of the users, intentional misspelling of words, proper nouns, slangs, abbreviations, acronyms, general disregard of grammar rules and punctuation rules, etc. Accordingly, just as a search system trained on domain-specific language outperforms a search system trained on non-domain language, a topic classification model trained on domain-specific language (e.g., gamer language) may outperform a topic classification model trained on non-domain language. Accordingly, the present concepts may provide a domain-tuned language model that can better understand the language (words and sentences) used by the users providing the feedback 104 in the context of the relevant domain.

The present concepts may utilize a base natural language model 116, such as Turing Natural Language Generation (T-NLG) by Microsoft™, Bidirectional Encoder Representations from Transformers (BERT) by Google™, or Generative Pre-Trained Transformer 2 (GPT-2) by OpenAI™, or any other massive deep learning language model with a very large number of parameters that has been trained using a very large volume of text. The base natural language model 116 may have been trained using marked language modeling. The training may be unsupervised, i.e., without human intervention. An important contribution can be made by unsupervised pre-trained embeddings 120 that were learned from a large volume of unsupervised corpus, such as T-NLG, BERT, or GPT-2. This can initialize a self-learning process through its capability of general language understanding and, for the present concepts, domain-specific language learning.

This base natural language model 116 may then be fine-tuned using relevant domain language to develop a domain natural language model 118. For example, if the relevant domain is gaming, then the base natural language model 116 may be fine-tuned on a corpus of millions of examples of gaming domain language spanning a variety of gaming products and a variety of entry points for gaming user feedback. The base natural language model 116 may be fine-tuned on in-domain unlabeled documents. Documents with multiple fields can be encoded using a field-specific embedding applied at the input, concatenated together using special tokens to indicate the beginning of each field. In the experiment that was conducted, the T-NLG model was fine-tuned using a corpus gaming language documents to create a gaming domain specific version of the T-NLG model. The domain natural language model 118 may provide an initial feature map that can provide, for example, a 768-dimensional vector.

This fine-tuned domain natural language model 118 may then be further trained and scored with the seed verbatims 112 that have been manually labeled by human SMEs 110. The feature map provided by the domain natural language model 118 may be called a temporary feature map since the weights of the embeddings may be updated. The result may be a machine learning model that can be used during run-time service for classification of known topics and deep clustering of emerging topics.

In some implementations, the domain natural language model 118 may use the embeddings 120, i.e., feature extractions having many weights, and use the final vectors that are calculated through these weights to cluster the verbatims. The weights may also change before the final vectors are calculated and can be used to cluster the verbatims. Therefore, deep clustering of verbatims whose classifications are not known may be used to update the weights in the embeddings 120 before calculating the final vectors. The final vectors may be normalized to achieve a unit length of each vector.

In some implementations, to generate a vector for a verbatim, each word in the verbatim may be mapped to a corresponding word embedding using the domain natural language model 118 (e.g., a domain-specific tuned version of the Turing model or the BERT model), and then the word embeddings can be summed, averaged, or concatenated using a beginning-of-sentence token as an identifier for the whole verbatim. Accordingly, seed vectors 122 corresponding to the seed verbatims 112 may be generated using the embeddings 120, and raw vectors 124 corresponding to the raw verbatims 114 may be generated using the embeddings 120. In one implementation, each verbatim may be represented by a vector having a size of 1×768.

The present concepts may involve data augmentation. That is, the topic class labels for the seed verbatims 112 can be used for data augmentation to also label the raw verbatims 114. The definite labels assigned to the seed verbatims 112 may be used to assign pseudo labels (or temporary labels or synthetic labels rather than definite labels) to the raw verbatims 114. Accordingly, the labels for the reference topics may be extended to additional verbatims. Using the set of the labeled seed verbatims 112, the set of the unlabeled raw verbatims 114 (which may potentially be a much larger set) may be assigned temporary synthetic topic labels using transduction based on their similarities to the seed verbatims 112.

For example, the closest labeled seed verbatim 112, according to a preselected distance function, may be used to assign a pseudo label to an unlabeled raw verbatim 114. A distance threshold may be set for the value of the similarity measure to ensure a maximum similarity before a pseudo label is assigned to a raw verbatim 114. Consistent with the present concepts, the seed vectors 122 corresponding to the seed verbatims 112 having definite topic labels and the raw vectors 124 corresponding to the raw verbatims 114 having pseudo labels may then be used to jointly train a classification model 126 and a clustering model 128 to generate a machine learning model 130. The machine learning model 130 may classify the verbatims 106 into classification of known topic verbatims 132 and identify unknown topic verbatims 134 that do not belong to any of the known topics. The machine learning model 130 may be used at run time to classify new verbatims into the known topics and/or identify new topics.

Figure 2A:
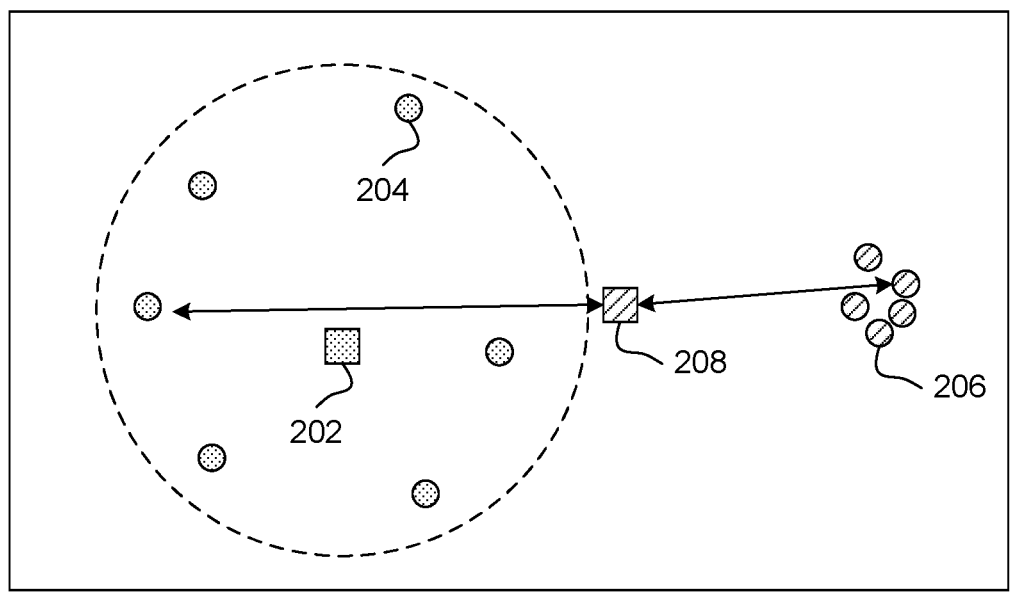
FIGS. 2A and 2B illustrate example generations of pseudo labels for verbatims, consistent with some implementations of the present concepts.
Figure 2B:
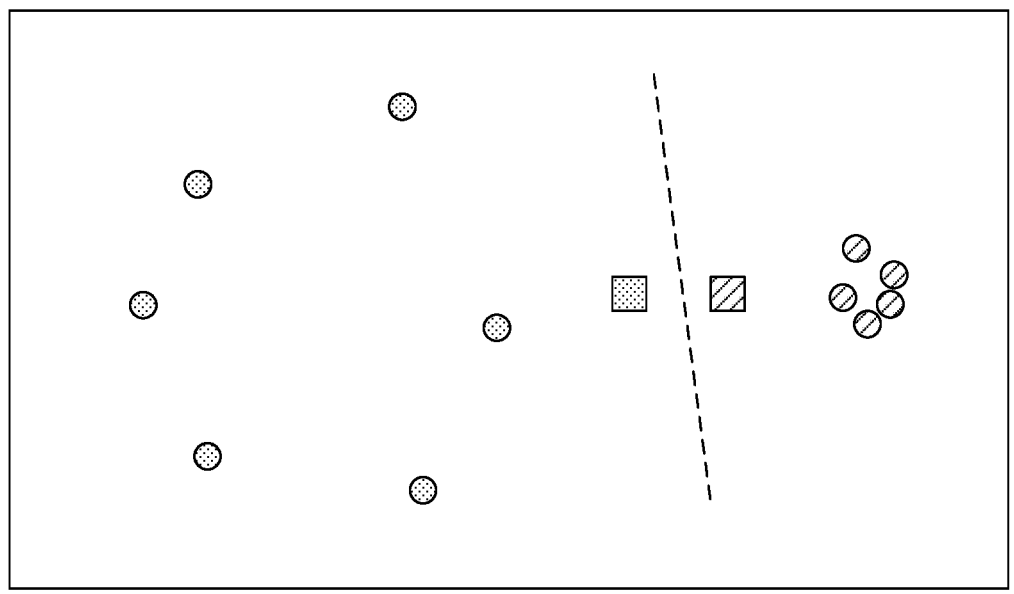

FIGS. 2A and 2B illustrate example generations of pseudo labels for verbatims, consistent with some implementations of the present concepts. In both figures, the circles may represent seed verbatims (which have definite topic labels), and the squares may represent raw verbatims (which do not have labels yet). In both figures, the shades (e.g., gray versus striped) of the verbatims (both circles and squares) may represent topic classifications. That is, the shades of the circles may represent the classifications associated with the definite labels that are assigned to the seed verbatims, and the shades of the squares may represent the classifications associated with the pseudo labels that are assigned to the raw verbatims. The number of verbatims and the number of classifications depicted in FIGS. 2A and 2B are few for illustration purposes.

The positions of the verbatims in the two figures may represent n-dimensional locations of the vectors corresponding to the verbatims. In one implementation, the location of a verbatim may represent the 768-dimensional coordinates of the corresponding vector. Accordingly, two verbatims whose 768-dimensional vectors are proximate or distant may appear correspondingly proximate or distant in the 2-dimensional t-SNE diagrams shown in FIGS. 2A and 2B.

The present concepts may use one of many different techniques for assigning pseudo labels to verbatims. Two example techniques are illustrated and described with respect to FIGS. 2A and 2B. As shown in FIG. 2A, the first example technique may involve averaging the Euclidean distances from an unlabeled raw vector to each of the seed vectors of a particular class. This can be the inclusive way to assign pseudo labels to raw verbatims. That is, if the seed vectors of a particular class are largely spaced and a raw vector is outside the hull of the largely spaced seed vectors, then the raw vector is unlikely to be assigned a pseudo label that corresponds to the same class as these largely spaced seed vectors, because the average Euclidean distance from the raw vector to each of the largely spaced seed vectors may be too far (i.e., above a threshold).

For example, to assign a pseudo label to a raw verbatim, the Euclidean distances between the corresponding raw vector 202 (gray square) and all the seed vectors (circles) may be checked. The average Euclidean distance between the subject raw vector 202 and the seed vectors 204 of a particular topic (represented by the gray circles) may be the shortest compared to the average Euclidean distances between the subject raw vector 202 and the seed vectors 206 of other topics (e.g., represented by striped circles). Therefore, the subject raw verbatim may be temporarily assigned a pseudo label of the same topic class as the definite label assigned to the gray circle seed verbatims.

Similarly, as another example, to assign a pseudo label to a raw verbatim corresponding to a raw vector 208 (striped square), the Euclidean distances between the subject raw vector 208 and all the seed vectors (circles) may be checked. The average Euclidean distance between the subject raw vector 208 and the seed vectors 206 of a particular topic (represented by striped circles) may be the shortest compared to the average Euclidean distances between the subject raw vector 208 and the seed vectors 204 of other topics (e.g., represented by gray circles). Therefore, the subject raw verbatim corresponding to the raw vector 208 may be temporarily assign a pseudo label of the same topic class as the definite label assigned to the striped circle seed verbatims.

The average Euclidean methodology in FIG. 2A may be represented as:

$$L = \mathrm{argmin}_i \left( \frac{1}{n} \sum_{j=1}^{n} \|X - X_{ij}\| \right) \quad \text{(Formula 1)}$$

In the above formula, L may represent the label vector of each verbatim. The label vector may have a size of the number of verbatims by 1. Further, n may represent the number of seed verbatims per topic class, i may represent an index of the class and thus may range from 1 to the number of classes, j may represent an index of the seed verbatim of a class and thus may range from 1 to the number of seed verbatims in a class, X may represent the subject raw vector under consideration, and $X_{ij}$ may be the vector of the jth seed verbatim of the ith class. The raw vector and the seed vector may have a size of, for example, (1, 768). As explained above, this technique makes data points exclusive for widely spaced seed verbatims.

As shown in FIG. 2B, the second example technique may involve using a k-nearest neighbors (KNN) approach, where the selected number of neighbors is 1 (k=1). Other values for k are possible to consider the labels of multiple neighbors. Where k=1, the nearest seed verbatim (circle) is considered as the neighbor for determining the pseudo label class of the subject raw verbatim (square) under consideration.

This second example technique may allow a class to have multiple semantically different seed verbatims. Given a class having semantically very different seed verbatims (i.e., largely spaced seed vectors), a raw verbatim may be assigned a pseudo label associated with this class even if the raw vector is not close to all the seed vectors in this class. The raw verbatim only needs to have enough similarity with any one of these seed verbatims; the raw verbatim does not need to be similar to every seed verbatim in the class.

The second example technique may show less amount of confusion of assigning the correct pseudo labels compared to the first example technique. The second example technique may allow raw verbatims to surround the enclosing hull of the seed verbatims of a class. Thus, the seed verbatims may be positioned inside the raw verbatims and may work like cluster centers. Accordingly, the classification results may not be too sensitive to the decision boundaries nor to the spacing of the raw verbatims.

The KNN methodology in FIG. 2B may be represented as:

$$L = \mathrm{argmin}_i (\min \|X - X_{ij}\|)_{j=1, \ldots, n} \quad \text{(Formula 2)}$$

The variables in Formula 2 may have the same representations as the variables in Formula 1 described above in connection with FIG. 2A. The second example technique makes data points inclusive for widely spaced seed verbatims. That is, a raw verbatim that is outside the enclosing hull of seed verbatims of a class may be assigned a pseudo label associated with the same class as the seed verbatims, even if the raw vector is distant from many of the seed vectors, so long as the raw vector is near any one of the seed vectors.

If a raw verbatim's minimum distance to the seed verbatims in any class is too far, then the raw verbatim may not belong to any of the known topic classes. In some implementations, raw verbatims whose distances to seed verbatims are too far may be assigned to the unknown class. For example, raw verbatims whose distances to seed verbatims are above a distance threshold (e.g., an absolute threshold value or a percentile threshold value, such as 95 percentile) may be labeled with a pseudo label associated with the unknown class. Thus, the criteria for the unknown class may be represented as:

$$\min D_{Euc} > P95(\min D) \quad \text{(Formula 3)}$$

The threshold may be set higher or lower depending on the practical situation.

After the assignment of pseudo labels to the raw verbatims, the classification model may be trained to perform classification steps. The present concepts may involve agglomerative clustering technology using temporary feature maps to identify topic clusters with a minimal number of seed verbatims as clustering centers to update the embeddings and guide, relieve, or even skip human annotation effort. The present concepts may be enabled by embeddings that were pretrained on large sets of corpus and additionally trained on domain-specific corpus, and thus able to capture viable features to help agglomerative topic clusters be guided even from initial feature map. During this process, the Euclidean distances to every seed verbatim in each topic cluster may change at each training epoch as the feature map is updated by back propagation of classifier training based on these pseudo labels.

The problem with conventional deep clustering, which is an unsupervised method, such as k-means clustering, is that datasets may be clustered into groups but the neural network decides on the cluster centers (or decides the datasets around which clusters will be formed). On the contrary, the present concepts can fix the cluster centers using seed verbatims. Thus, the clustering model of the present concepts can be a classifier, because raw verbatims in cluster groupings can be classified according to the nearest seed verbatims. Also, the present concepts need not rely on a neural network's decision on grouping, because the groupings may be defined when the SME selects the topics and their representative seed verbatims, and cluster centers can thus be locked (i.e., fixed).

Consistent with the preset concepts, data augmentation can be used to fix the cluster centers. Unlike conventional deep clustering, such as image clustering with k-means technology by Facebook™, the present concepts may assign cluster centers using an agglomerative approach in a normalized vector space and using generic verbatims as seeds to avoid seeding borderline data among multiple topic labels for the locking function. The model may have the ability to fix the clustering centers using the seed verbatims. To assist this locking, discriminator penalty may be applied when missing classification of generic verbatims are used as seeds (i.e., cluster centering). The classification of the seed verbatims is discriminated as being more important by applying higher loss penalty compared to the classification of raw verbatims. This focus on the accuracy of the seed verbatim classification will help make cluster center fixing effective.

Conventional models move clustering assignments and change clustering rules. For example, conventional k-means clustering does not control clustering rules but rather just try to minimize clustering loss. However, the present concepts have clustering rule control and fix clustering centers by having the seed verbatims define the clustering rules. Because the present concepts do not move clustering assignments and fix instead, convergence and efficiency can be greatly increased compared to conventional techniques.

Consistent with the present concepts, the classifier may be trained using the temporary embeddings and the temporary labels. And, the classifier may be used to update the embeddings. The training of the classifier may involve labeling epochs (also called relabeling epochs or clustering epochs) and classification epochs.

The above-described technique for generating seed vectors and raw vectors using the initial embeddings and assigning pseudo labels to the raw verbatims may be considered the first labeling epoch (iteration 0). Then a classification layer (a linear layer) may be added to perform the classification epoch.

In some implementations, each classification epoch includes two stages. The first stage may involve the classification of seed verbatims having definite labels, and the second stage may involve the classification of raw verbatims having pseudo labels.

In the first stage, the seed verbatims, which have known topic assignments, go through the classifier so that the classifier can be trained to learn to classify the raw verbatims in the appropriate classes together with the seed verbatims. After the first stage, the embeddings may have learned how to tune the weights in order to successfully classify the raw verbatims.

In the second stage, the classifier is trained to classify the raw verbatims having the pseudo labels and tries to learn to classify the raw verbatims together with seed verbatims, such that the pseudo labels of the raw verbatims match up with the topic assignments of the seed verbatims. That is, in reference to the illustrations in FIGS. 2A and 2B, the classifier may learn to classify the gray square raw verbatim 202 together in the same class as the gray circle seed verbatims 204, and to classify the striped square raw verbatim 208 in the same class as the striped circle seed verbatims 206.

In the first stage, to ensure the correct classification of the seed verbatims, weights multiplied to the categorical cross entropy loss can be applied to the seed verbatims having ground-truth labels with small amount compared to the raw verbatims having pseudo labels. For example, a lambda multiplier (see Formula 4 below) may be used to apply more loss (i.e., putting more weight or more penalty) to seed verbatim classification to ensure that seed verbatims are correctly classified since seed verbatims have ground-truth labels, whereas smaller loss (e.g., usual categorical cross-entropy loss) may be applied for classifying raw verbatims that have pseudo labels.

$$L_{seed} = \lambda \Sigma_{i=1}^{c} t_i \log(f(s)_i) \quad \text{(Formula 4)}$$

$$L_{pseudo} = -\Sigma_{i=1}^{c} t_i \log(f(s)_i) \quad \text{(Formula 5)}$$

In the above formulas, $L_{seed}$ may be a classification loss applied to a seed verbatim, $L_{pseudo}$ may be a classification loss applied to a raw verbatim, C may be the number of classes, t may be the ground-truth target vector, and f may be the softmax probability prediction vector. The hyperparameter $\lambda$, which may be a multiplier, can be determined approximately with the ratio $$\frac{N_{total}}{N_{seeds}},$$

where $N_{seeds}$ may be the number of seed verbatims and $N_{total}$ may be the total number of raw verbatims, which have pseudo-label assignments. The formulas use an Einstein index for the dot product and use a sigma summation for the final linear layer for classification. Accordingly, these formulas impose discriminated losses for seed verbatim classification and pseudo-label classification.

To be able to implement this model, the expected taxonomy of topics as well as the proportion of the verbatims that does not belong to the target taxonomy may need to be known. This way, there can be a separate class (i.e., an unknown class) where all the verbatims with unassignable topics can be classified into. Furthermore, the percentage of unknown verbatims may be estimated by having an SME sample the raw verbatims and approximating the proportional value after evaluating these samples. For improved classification capability, a lower percentage of unknown verbatims is recommended since the percentage represents the level of impurity. Here, a high level of purity means the level (or percentage) of verbatims being assigned to a known topic class is high, whereas a low level of purity means the level of verbatims being assigned to a known topic class is low.

Once the minimum Euclidean distance to a seed verbatim among all the seed verbatims in a class is calculated, this distance within a class may be used as a reference. This process can be done the same way for all the known reference classes, resulting in a vector ($\vec{D}^j$) with a size of the number of known classes for jth verbatim.

$\mathbb{D}$ may be a matrix with a size of ($N_{total}$, C), where $N_{total}$ may represent the number of raw verbatims and C may represent the number of classes. For the jth verbatim, which corresponds to the jth row vector $\vec{D}^j$ in matrix $\mathbb{D}$:

$$\text{Label}^j = I = \text{argmin}(\vec{D}^j)$$

$$d^j = \min(\vec{D}^j)$$

$$d^T = [d^1 \ldots d^j \ldots d^{N_{total}}]$$

If $d^j > x$, then $\text{Label}^j = U$  (Formulas 6)

In the above formulas, $\text{Label}^j$ may represent the jth verbatim's label vector, I may be a constant label to refer to $\text{Label}^j$, $d^T$ may represent the transpose of the d vector (i.e., the minimum distance vector of each label), x may be the cut-off value that corresponds to the threshold set by percentile information of unassignable, and U may be the class that represents unassignable verbatims.

FIGS. 3A and 3B illustrate example updating of embeddings and pseudo labels through training epochs, consistent with some implementations of the present concepts. These two figures depict a scatter plot of vectors corresponding to verbatims. These scatter plots may be generated using a t-distributed stochastic neighbor embedding (t-SNE) algorithm. Each verbatim is depicted in the plot by a symbol (e.g., white circle, black circle, white triangle, black triangle, white square, black diamond, white pentagon, black cross, black star, etc.) representing a topic classification (of definite labels and pseudo labels). The positions of the verbatims in the plot may represent n-dimensional locations of the vectors corresponding to the verbatims. Only a small number of verbatims and a small number of symbols are depicted in the two figures for illustration purposes.

FIG. 3A shows a plot of the original vectors of the verbatims that were generated based on original embeddings, which have not been updated yet. The datasets in the plot can change in two ways during training. First, the location coordinates of the vectors in the plot may change as the embedding weights are calculated and updated with the classifier at each classification epoch. Second, the symbols of the raw verbatims (symbols representing the classifications of the pseudo labels) in the plot may change if different pseudo labels are assigned to the raw verbatims based on proximity to seed verbatims due to changes in location coordinates (due to change in embedding weights) at each clustering epoch (i.e., relabeling epoch).

In one example implementation, there may be seven labeling epochs, and for each labeling epoch, there may be seven classification epochs. Other combinations of the number of labeling epochs and the number of classification epochs are possible.

Each classification epoch may include a seed-classification task and a pseudo-classification task that can change the embedding weights. At each classification epoch, a seed-classification task may be created and trained first. Then, a pseudo-classification may be performed based on the pseudo labels that were assigned prior to the seed-classification task. And this process may be repeated—computing the proximities and assigning new pseudo labels for raw verbatims, a seed-classification task, and then training as if the pseudo labels were true labels for this clustering epoch. The classification tasks may create more separation between verbatims that have different pseudo labels and may cling together verbatims of same topics. Through the progression of the multiple epochs, the model may be learning a representation that can classify the raw verbatims into their pseudo labels.

Once the relabeling of raw verbatims occurs during the labeling epoch and the certain pseudo labels have been updated, the model may temporarily trust the updated pseudo labels as the correct labels to go through classification steps in the classification epochs, which may involve changing the embeddings. Then, the updated embeddings may be trusted to calculate the raw vectors again for the raw verbatims to try to determine again their pseudo labels (i.e., their symbols). Updating the embeddings may change the location coordinates of the verbatims on the plot. After the location coordinates change, the model may change the pseudo labels (i.e., symbols) based on the new coordinates. Because the embeddings can be updated using the temporary labels, full annotations of all verbatims may not be necessary with the present concepts.

FIG. 3B shows a plot of the vectors after seven labeling epochs (i.e., after six symbol updates). These six epochs of updating the embeddings may serve the classification objective.

A conventional classifier that uses the k-means technique does not use seedlings as pivots. Thus, even if discernible clusters are formed, there is still no insight on what topics the clusters represent. A human would need to manually evaluate the datasets in the cluster groupings to determine their relevant topics. On the contrary, the clusters formed using the present concepts may include seed verbatims with known topics as cluster pivots and thus the topics of the clusters can be known.

Furthermore, conventional classifiers tend to focus too much on clinging similar datasets together and thus suffer from overfitting. However, the present concepts can avoid overfitting of the grouping rules that is typical with conventional deep clustering techniques that produce results with overly segregated topic clusters without borders between topics, which is often not a correct result in real-life practical topic analyses.

As seen in FIG. 3B, the plot of the verbatims for the present concepts does not necessarily have wide gaps, clear borderlines, or definitive boundaries between the clusters, because some verbatims relate to multiple topics and thus should be clustered to belong to multiple groups. Unlike conventional free clustering, fixed clustering of the present concepts can maintain borderlines between topic clusters, which avoids overfitting and can be more useful for topic-based classification.

By avoiding using the k-means technique, the present concepts need not remove the top layer for classification, and this may enable faster convergence. The top layer may take an input size of 768 and have an output size of the number of classes. The weights of the top layer need not be saved at each clustering epoch and instead may be trained again after new pseudo-label assignments from a clustering epoch, because the same raw verbatim can have a different pseudo-label assignment at the next labeling epoch. The convergence of the top layer may indicate the accuracy of each classification epoch.

Figure 4A:
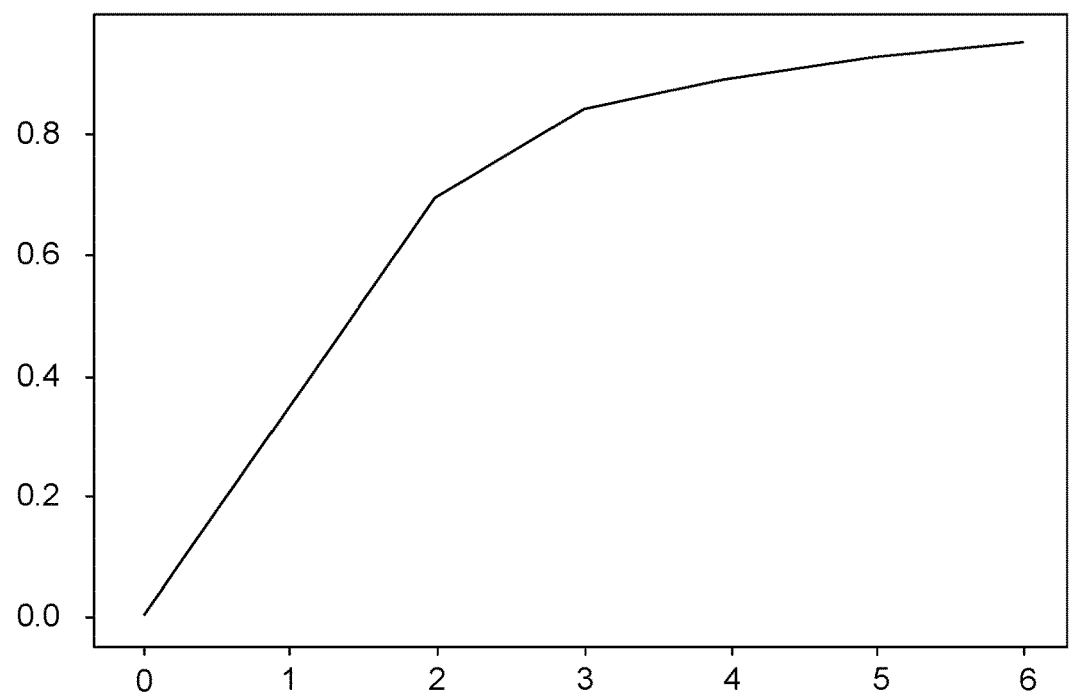
FIGS. 4A and 4B illustrate an example progress through training epochs, consistent with some implementations of the present concepts.
Figure 4B:
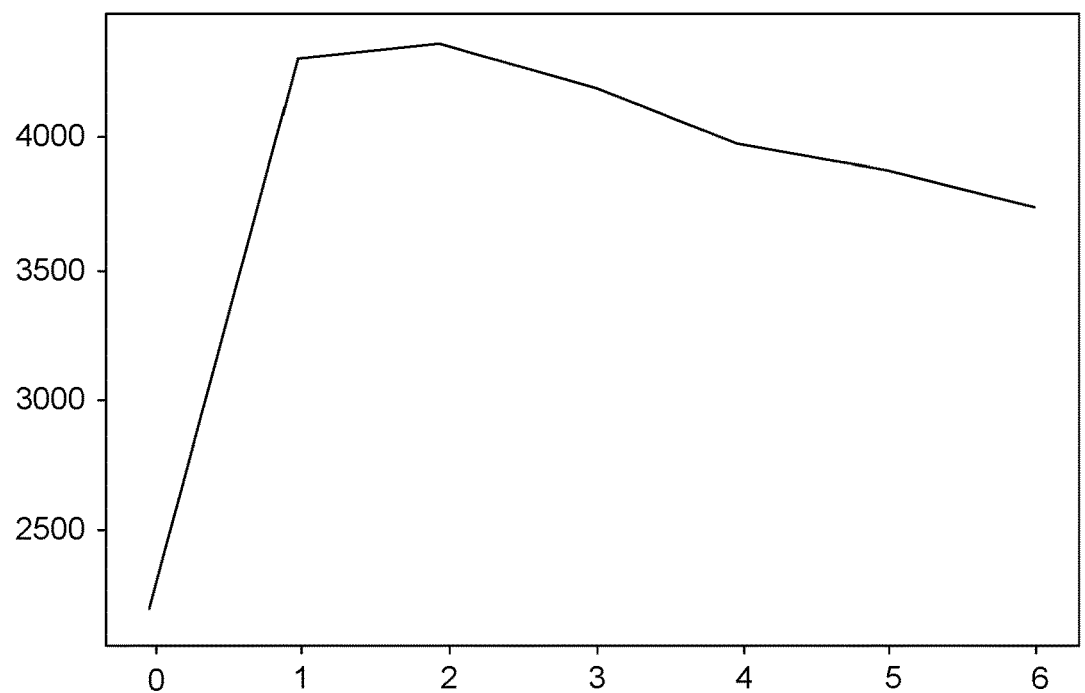

FIGS. 4A and 4B illustrate example progress through training epochs, consistent with some implementations of the present concepts. In some implementations, the number of raw verbatims or the normalized mutual information (NMI) during the labeling epoch may be determined. FIG. 4A depicts a graph with training epoch iterations on the x-axis and the NMI value on the y-axis. A higher NMI value may indicate that better labeling or clustering is achieved. In some implementations, the training process may be stopped at the end of a labeling epoch if at least one of two conditions is satisfied: (1) a high NMI value above an NMI threshold is achieved, or (2) the change in the NMI value is below a threshold compared to the previous NMI value or compared to several previous iterations of NMI values.

During training, the number or percentage of raw verbatims that do not change their pseudo label assignments may be low during the early training epoch iterations and progressively increase with subsequent training epochs iterations, thereby increasing the NMI value. In the example shown in FIG. 4A, the NMI value has reached 0.942 by the sixth epoch iteration. A threshold for the NMI value can be set (e.g., around 0.9 or 0.95) to be used as labeling iteration termination criteria (or convergence criteria).

Afterwards, the current pseudo labels assigned to the raw verbatims may be assigned as the definite labels for the raw verbatims. Alternatively, one or more definite labels may be assigned to the raw verbatims by checking the Euclidean distances from the raw verbatims to the nearest seed verbatims and determine whether the distances meet a threshold.

The number of epochs that may be run can vary depending on the threshold level of desired accuracy and/or how quickly the datasets achieve the desired accuracy threshold. Generally, as the number of classes grow, the training time may grow.

FIG. 4B depicts a graph that shows clustering loss on the y-axis and training epoch iterations on the x-axis. The clustering loss in the graph may be the summation of all verbatims' minimum distances to the closest seed verbatims. During the early iterations, the model tries to identify features that matter for classification accuracy. And then, during the later iterations, the increase in classification accuracy relieves the weights associated with features that are less important, so the clustering loss drops. This phenomenon can help avoid overfitting.

In some implementations, the model may be verified for accuracy. For example, the seed verbatims that were manually labeled can be checked to confirm that the model is correctly classifying the seed verbatims in the correct topics.

TABLE 1

|  | Iteration 0 | Iteration 6 |
| --- | --- | --- |
| Seed Accuracy | 66.9% | 97.7% |
| Training Accuracy | 45.5% | 91.6% |
| Validation Accuracy | 45.1% | 85.3% |

In the above table, the iteration numbers in the header row refer to the labeling epoch iterations. The seed accuracy in the table can be calculated as the number of correctly classified seed verbatims divided by the total number of seed verbatims after the classification epochs finish. The set of all raw verbatims may be divided into a subset of training raw verbatims and a subset of test raw verbatims. The training accuracy in the table can be calculated as the number of correctly classified training raw verbatims divided by the total number of training raw verbatims. The validation accuracy in the table can be calculated as the number of correctly classified test raw verbatims divided by the total number of test raw verbatims. The training accuracy and the validation accuracy may be based on the pseudo labels assigned based on proximity to the seed verbatims since the raw verbatims do not have ground-truth labels. The accuracy of topic assignments may increase with more iterations. As shown in the above table, 97.7% of the seed verbatims were classified correctly after six iterations of relabeling.

FIG. 5 illustrates example raw verbatims and candidate topic classifications, consistent with some implementations of the present concepts. FIG. 5 includes a chart showing five examples of raw verbatims and their corresponding Euclidean distances to the closest five seed verbatims of different topic classes. These distances may be calculated based on the last location coordinates of the raw vectors and the seed vectors at the end of the last training epoch. Thus, the topic label corresponding to the closest seed verbatim would match with the topic of the last pseudo label assigned to a raw verbatim at the end of the training epochs.

In some implementations, a distance threshold may be used to determine whether the Euclidean distances are close enough to assign the corresponding topic class labels to the raw verbatims. The distance threshold may be an absolute value of a designer's choice or a percentile value of all distances for a particular raw verbatim. Therefore, each raw verbatim may have a different threshold applicable to it. In FIG. 5, the topics corresponding to distances that satisfy the threshold for each raw verbatim have been bolded. During training, the closest distance that satisfies the distance threshold may be used to assign a pseudo label to the raw verbatim. Only one pseudo label corresponding to one topic may be assigned to a raw verbatim during training.

However, when training is completed, during inference step, multiple topics can be returned as a classification result. For example, FIG. 5 shows that an example raw verbatim having the text "cant sing in to a game" has a distance of 0.469725 to a seed verbatim for the topic "sign on issue," a distance of 0.864935 to a seed verbatim for the topic "can't play game," a distance of 1.06850 to a seed verbatim for the topic "subscription issue," a distance of 1.09847 to a seed verbatim for the topic "computer hardware," and a distance of 1.1845 to a seed verbatim for the topic "error codes." In this example, the distances to the "sign on issue" and "can't play game" topics satisfy the distance threshold. Accordingly, the raw verbatim of "cant sing in to a game" may be assigned definite labels for topics "sign on issue" and "can't play game." If conventional clustering using k-means techniques had been employed, the distance to the closest seed verbatim may be far less than the distances to other seed verbatims belonging to different topics, due to conventional clustering's tendency to overfit, and this label may not end up being one of the clusters as conventional clustering do not have control of what to cluster around. Even in a case where the clustering rule exactly matches with the labeling rule by accident, with conventional clustering, the top ranked distance may be 0.1 or lower, while the other distances may be 2.0 or higher.

In some implementations, there may be raw verbatims that do not fit into any of the known topics. For instance, raw verbatims whose Euclidean distances to seed verbatims are greater than the distance threshold may be determined as not relating to any of the known topics. Such raw verbatims of unknown topic may be assigned to the unknown class. Accordingly, the known class may contain one or more verbatims of unknown topics (i.e., unknown verbatims).

In some implementations, the machine learning model may perform free clustering of the unknown verbatims and try to group them based on their similarities. For example, a classic clustering algorithm (such as k-means) may be performed on the unknown verbatims. In one implementation, synthetic labels may be assigned to the formed cluster groups using their respective cluster IDs.

Then, these synthetic labels of unknown topics assigned to the unknown verbatims, the pseudo labels of known topics assigned to the raw verbatims, and definite labels of known topics assigned to the seed verbatims may be used to train a supervised learning task and update the model used to vectorized verbatims. This classification task may be used in order to allow for the output schema (i.e., topic prediction results) for classification to be easily updated without retraining in the future. Then, this process may be repeated through iterations until the NMI value, calculated based on the previous pseudo labels, of the assigned labels for the full dataset converges. When converged, the NMI value does not change significantly and stays mostly constant.

Suggested topics may be the output of machine labeling by deep (unsupervised) clustering and may be used to perform clustering on verbatims to identify new or emerging topics. Suggested topics may be evaluated by a human SME who can decide to create a new topic or put the verbatims in the suggested topic as additional examples (i.e., seed verbatims) in an existing topic.

Optionally, a human (e.g., an SME) may review the unknown verbatims in the unknown class, review the clusters of unknown verbatims, identify a new topic to be detected in the future, update the taxonomy of known topics by adding the new topic, and label seed verbatims for the new topic (for example, using one or more of the unknown verbatims related to the new topic). This process may also be performed by an SME without having performed the free clustering of the unknown verbatims.

A new output class for the new topic can be added to the taxonomy of known topics by augmenting the set of labeled seed verbatims, i.e., creating new entries containing seed verbatims for the new class. This addition may allow the model to predict the new class by computing the distances of an unlabeled unseen example with the newly added examples.

In some implementations, if it is known that the taxonomy of topics does not cover all topics that exist in the datasets, then the distance threshold (e.g., shown in Formula 3 above) may be set sufficiently high so that raw verbatims that do not quite fit into the topics would not be assigned to any of the topics but instead would be clustered with one another based on their similarities and be assigned synthetic labels. So, if the taxonomy includes 19 known topics, then at the end of the process, there may be verbatims clustered into 19 groups around seed verbatims for the 19 known topics plus, for example, 5 additional groups of unknown verbatims that are similar to one another.

In the example experiment that was conducted, a model consistent with the present concepts was used to classify 6,374 verbatims and achieved 98% accuracy (i.e., classified into correct classes) after 6 agglomerative clustering epochs while training the classifier (see Table 1 above). Therefore, the model classified over 6,000 verbatims with only 133 seed verbatims (around 2%), thus requiring only minimal human annotation effort. This experiment demonstrated the model's capability of generalization, helping the annotation process, and avoiding missing parts of topic assignments, where each verbatim can represent multiple topics. (Seed verbatims having labels are the labeled parts, and raw verbatims without labels are the missing parts.)

Conventional classifiers typically require 100% of the datasets to be labeled. The present concepts can train a model that groups verbatims based on their topical similarities without full annotation—indeed with only a small proportion of annotations (e.g., 3% or less of the verbatims labeled). The present concepts can use a limited set of labeled data to classify the remainder of unlabeled data. That is, the model can gather unlabeled data together with the labeled data with known topic assignments. Therefore, the present concepts can use both supervised way and unsupervised way to develop a classifier that can group all datasets, only a portion of which is labeled. Conventional techniques do not involve data augmentation of artificially generated seeds that are short verbatims and are mutually exclusive of each other, and do not put higher weights on the seed verbatim classifier than the pseudo-labeled verbatim classifier.

Figure 6:
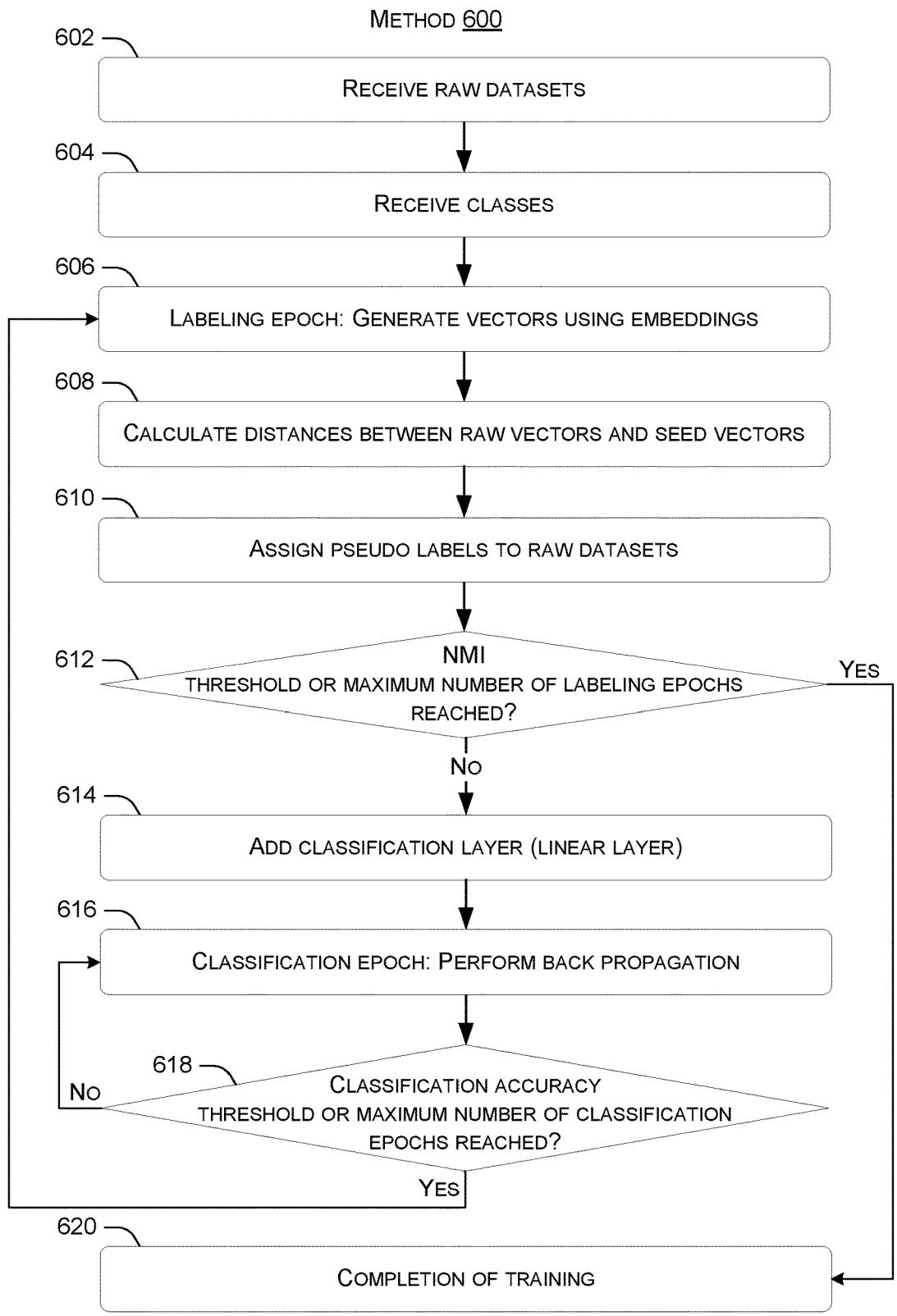
FIG. 6 illustrates an example training method, consistent with some implementations of the present concepts.

FIG. 6 illustrates an example of a training method 600, consistent with some implementations of the present concepts. The acts in the training method 600 may be performed in the order presented, in a different order, or in parallel or simultaneously, or may be omitted.

In act 602, raw datasets may be received. For example, raw verbatims may be converted from feedback received from customers. The feedback may be sourced from multiple media platforms.

In act 604, a set of classes (or classifications) may be received from an SME. For example, a human may define a taxonomy of known topics that she wishes to infer, track, and monitor. The set of classes may include sets of seed datasets belonging to the set of classes. The seed datasets may have ground-truth labels (or definite labels) corresponding to the set of classes, assigned by the SME. In some implementations, each of these seed datasets may belong to only one class. For example, the seed datasets may be verbatims received from actual users and evaluated by the SME or editorial verbatims composed by the SME.

In act 606, a labeling epoch may be performed, in which seed vectors corresponding to the seed datasets and raw vectors corresponding to the raw datasets may be generated using embeddings from a natural language model. The natural language model may be a massive deep learning language model that has been fine-tuned using a corpus of domain-specific language.

In act 608, distances between the raw vectors and the seed vectors may be calculated. These may be Euclidean distances in a vector space.

In act 610, pseudo labels corresponding to the classes may be assigned to the raw datasets based on the distances calculated in act 608. In one example implementation, a KNN approach may be used to find a seed vector that is closest to a raw vector, and a pseudo label corresponding to the class of the definite label assigned to the closest seed vector may be assigned to the raw dataset. Accordingly, the ground-truth labels manually assigned to the seed datasets by the SME may be used to augment the unlabeled raw datasets with pseudo labels.

In act 612, the NMI value may be checked against the NMI threshold, and/or the current number of labeling epochs may be checked against the maximum number of labeling epochs. For example, the NMI threshold may be set to 0.94, and the threshold maximum number of labeling epochs may be set to 10. Other threshold values are possible. The NMI value may be calculated each time a labeling epoch is performed. If either condition is satisfied, then the training method 600 may proceed to act 620 to complete the training method 600. If neither condition is satisfied, then the training method 600 may proceed to act 614, in which a classification layer (a linear layer) may be added for a classification epoch.

In act 616, a classification epoch may be performed, in which back propagation may occur to minimize classification loss. Back propagation may involve updating the embeddings to learn to classify the seed datasets and the raw datasets, assuming temporarily that the pseudo labels currently assigned to the raw datasets are ground-truth labels. Therefore, a classifier can be trained on datasets that are not fully annotated.

In act 618, a classification accuracy may be calculated and checked against the classification accuracy threshold, and/or the current number of classification epochs (since the previous labeling epoch) may be checked against the maximum number of classification epochs. For example, the classification accuracy threshold may be set to 97%, and the threshold maximum number of classification epochs may be set to 10. Other threshold values are possible. If neither condition is satisfied, then the training method 600 may return to act 616, in which another classification epoch may be performed. Therefore, multiple classification epochs (i.e., multiple passes through all the datasets) may be performed, and the embeddings may be further updated with each classification epoch. Furthermore, the annotated seed datasets can serve as cluster centers around which the raw datasets will cling to during the classification task. If either condition is satisfied, then the training method 600 may return to act 606, in which another labeling epoch may be performed. Therefore, multiple labeling epochs (i.e., assigning pseudo labels) may be performed during the training method 600. Moreover, multiple loops of classification epochs may be nested inside each loop of labeling epoch.

When repeating a relabeling epoch in act 606, seed vectors and raw vectors may be regenerated using the embeddings updated during the previous classification epoch in act 616. Since the embedding weights may have changed in the previous classification epoch in act 616, the seed vectors and the raw vectors may change accordingly during the subsequent relabeling epoch in act 606, the distances between the raw vectors and the seed vectors may change accordingly in act 608, the closest seed vectors to the raw vectors may change accordingly, and thus different pseudo labels may be assigned to the raw datasets in act 610. When repeating a classification epoch in act 616, classification tasks may be performed believing the updated pseudo labels as ground-truth labels.

The result of the above-described training techniques may be a machine learning model that can be used during run time (i.e., inference time or prediction time) for classification of known topics and identification of new topics.

Figure 7:
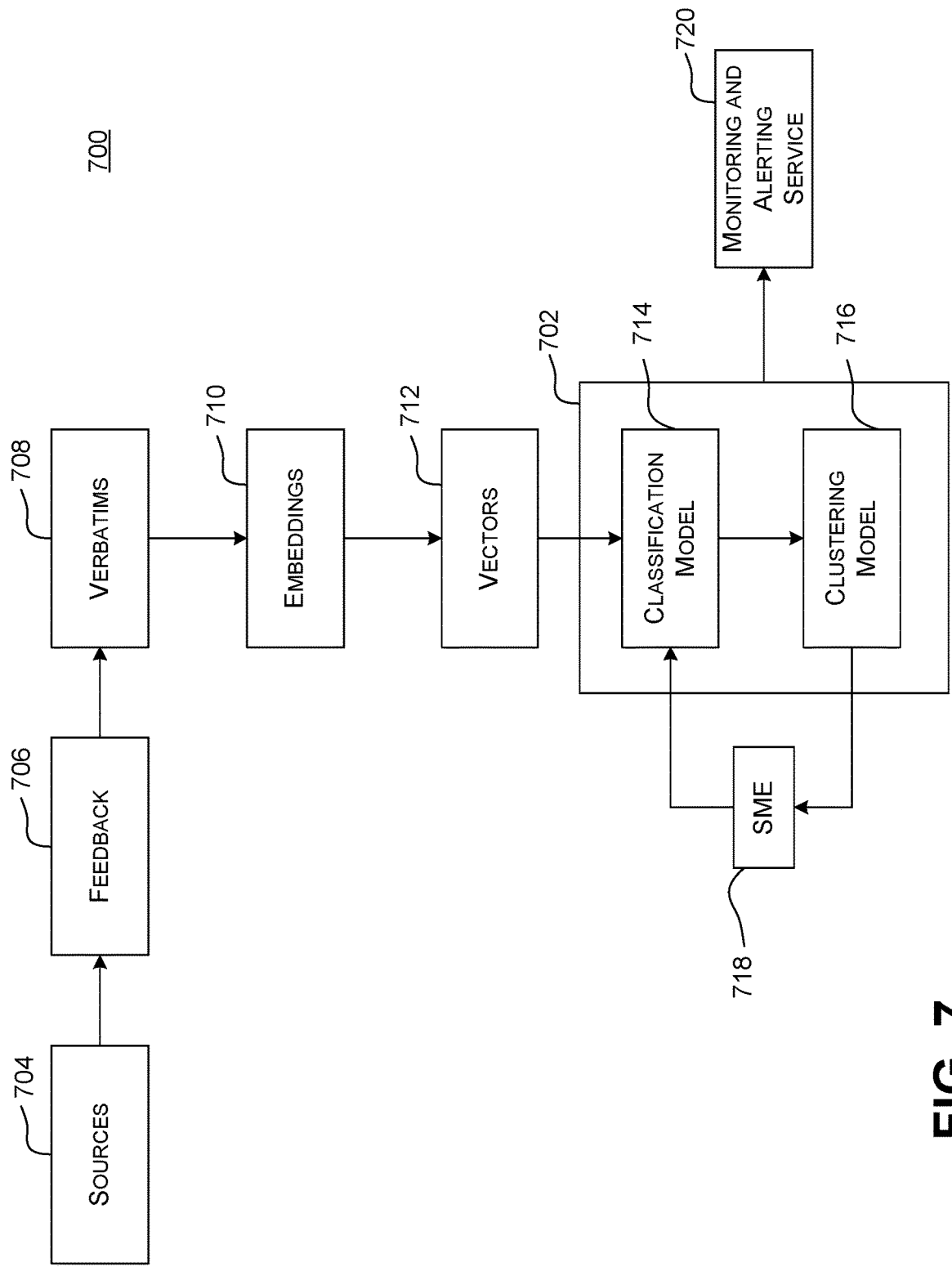
FIG. 7 illustrates an example run-time workflow for using a machine learning model, consistent with some implementations of the present concepts.

FIG. 7 illustrates an example run-time workflow 700 for using a machine learning model 702, consistent with some implementations of the present concepts. A process described above for training with respect to FIG. 1 for receiving user feedback from various sources and converting them to actionable verbatim vectors may be implemented similarly during run time as well. At run time, sources 704 may provide feedback 706 from users or customers. These sources 704 may be the same or different from the sources 102 from which the training datasets were obtained, such as polls, survey answers, searches, forum posts, customer feedback, chat messages, social media, etc. The feedback 706 may relate to one or more of the known reference topics that the model 702 was trained for. For example, a gaming organization may collect a large amount of free-form feedback 706 from many sources 704.

The feedback 706 received from the source 704 may be converted into new verbatims 708 that the trained model 702 has yet to analyze. As with the verbatims 106 used for training, the new verbatims 708 may be translated from one language to another and may be stripped of PII. The trained model 702, consistent with the present concepts, can assist in understanding and gaining insight into the new verbatims 708, for example, the issues customers are experiencing, the complaints that customers have, etc., without requiring humans to manually read a large volume of new verbatims 708. Next, the new verbatims 708 may be converted into vectors 712 using embeddings 710 learned through the domain natural language model 118 discussed above and through training the model 702.

The model 702 of the present concepts may include two model services for performing the classification of the new verbatims 708 into topics-based classes. The first model service may be a classification model 714, and the second model service may be a clustering model 716 (also called a topic suggestion model). The two model services may be combined into the single model 702 (i.e., a single service).

The classification model 714 may take a new vector 712 that represents a new verbatim 708 and attempt the classification into one or more known topics. The classification model 714 may compare the new verbatim 708 against multiple examples of verbatims that make up the known topics. The classification model 714 may calculate distances between the new verbatim 708 and seed verbatims, and the new verbatim 708 may be classified into one or more known topics if the distances are close enough to satisfy a distance threshold. For example, the distance threshold may be set to be less than a certain percentile (e.g., less than 95 percentile) of all distances to seed verbatims.

At run time, a set of labeled verbatims may be maintained from the training time and from previous run times. For instance, the labeled verbatims may be stored in a verbatim database.

In some implementations, a classification prediction may be determined for a new verbatim 708 by computing the distances from the set of labeled verbatims and then aggregating the distances for each class among those neighbors. Then, the distance values may be compared to a threshold to select which labels to predict.

The classification model 714 may assign the new verbatim 708 to any number of known topics if the distances are within the threshold. In one implementation, the plurality of topic assignments for one new verbatim 708 may be ranked based on the distances. For instance, referring back to FIG. 5, which shows five example verbatims, the topics corresponding to distances that satisfy the validity of topic assignments are highlighted in bold.

In some implementations, if the classification model 714 did not assign the new verbatim 708 into any of the known topics, then the new verbatim 708 may be assigned to an unknown class. The concept of the unknown class here during inference time is different from the concept of the unknown class previously discussed above in connection with training steps. Here, at inference time, new verbatims that are not assigned to the known topics can be set aside for new topic detection. That is, if the distances for the new verbatim 708 are higher than the threshold, then the new verbatim 708 may be passed into the clustering model 716. Then, the clustering model 716 may attempt to identify where the new verbatim 708 belongs.

The new verbatims 708 that were not classified into a known topic (i.e., were classified into the unknown topic category) may be processed by the clustering model 716. In one implementation, a collection job may run periodically (e.g., daily, weekly, or monthly) to collect all new verbatims 708 that were classified as an unknown topic, and these new verbatims 708 may be sent to the clustering model 716.

In some implementations, the clustering model 716 may use deep clustering techniques to cluster the new verbatims 708 of unknown topic into groups based on similarity of topics, and synthetic labels may be assigned to the new verbatims 708. These machine-labeled new verbatims 708 may then be reviewed or audited by a human (e.g., an SME 718 or other human annotators) who can make a decision on whether certain new verbatims 708 represent a new topic or new expressions of a known topic. A new topic identified by the SME 718 may become a new known topic that may be added to the classification model 714, and the new verbatims 708 for the new topic may serve as seed verbatims for the new topic.

New verbatims 708 that are determined by the SME 718 to be new expressions of an existing known topic may become additional examples of verbatims for the existing known topic by assigning the appropriate definite label to the new verbatims 708. Therefore, the output of the clustering model 716 may be fed back into the training datasets for the classification model 714 to help it identify the new topics and existing topics in the future. That is, the result of this operation by the clustering model 716 may be fed back into the data pipeline that is used to retrain the classification model 714 so it can learn this new topic and learn to identify future verbatims relevant to the new topic.

In some implementations, the classification model 714 need not be retrained. The set of topic labels and the set of associated verbatims may be updated using the new topic and/or the new verbatims, and the classification model 714 can classify future verbatims based on their distances to the seed verbatims. In other implementations, the classification model 714 may be retrained after adding the new topic and/or the new verbatims by updating the embeddings for increased accuracy of future topic predictions.

In some implementations, the set of known topics and the verbatims belonging to those topics may be retained over time so that changes in the sizes of the topics (i.e., the numbers of verbatims classified into the various topics) can be tracked, measured, and compared across datasets by a monitoring and alerting service 720. For example, the processed verbatims that have been classified into one or more topic classes may be stored in a database. Such a database may be used by the monitoring and alerting service 720 for presenting a dashboard of relevant information or any other business needs. For example, if there is a significant spike in the number of new verbatims belonging to the "login issue" topic, such a trend may be presented on a dashboard to indicate the number of users experiencing login issued and to provide a notification. As another example, if a gaming provider made network infrastructure upgrades, then the gaming provider may monitor whether the number of new verbatims belonging to the "connectivity problems" topic has been decreasing since the upgrades. Accordingly, the new verbatims may be sent to the monitoring and alerting service 720 to help identify trending and emerging topics that are currently important to users of the model 702. In some implementations, the model services may be retrained and automatically deployed on a regular cadence (e.g., weekly, daily, every 6 hours, etc.) to identify trending topics.

The monitoring and alerting service 720 may also perform alert generation, trend analysis, anomaly detection, etc. Because the taxonomy of reference topics is known, the topics may be associated with, for example, tags, business groups, responsible individuals, etc. Therefore, the monitoring and alerting service 720 may send verbatims, topics, counts, trends, summaries, or any information generated by the model 702 to appropriate individuals (e.g., the relevant product groups within an organization) via dashboard, email, text message, phone call, or any other forms of media for notification.

In some implementations, during inference time, a long verbatim may be separately into multiple shorter verbatims. For example, a verbatim containing multiple sentences make be divided into multiple verbatims, each containing one or few sentences. Then, the model may consider the shorter verbatims separately, calculate Euclidean distances for each of the shorter verbatims, and classify the shorter verbatims into the appropriate topics.

FIG. 8 illustrates an example long verbatim separated into multiple shorter verbatims, consistent with some implementations of the present concepts. For instance, FIG. 8 shows the long verbatim (including four sentences) in FIG. 5 divided into three shorter verbatims (including one or two sentences each). Accordingly, the three shorter verbatims have been assigned to their respective topics based on their individual distances to seed verbatims of various topics. Breaking up a long verbatim into separate shorter verbatims can help one verbatim collect all possible information in detail with locations. For instance, the topic "Computer Hardware" appears as the top topic candidate for short sentence #1, whereas the topic appears less prominently for the long verbatim that includes four sentences.

Figure 9:
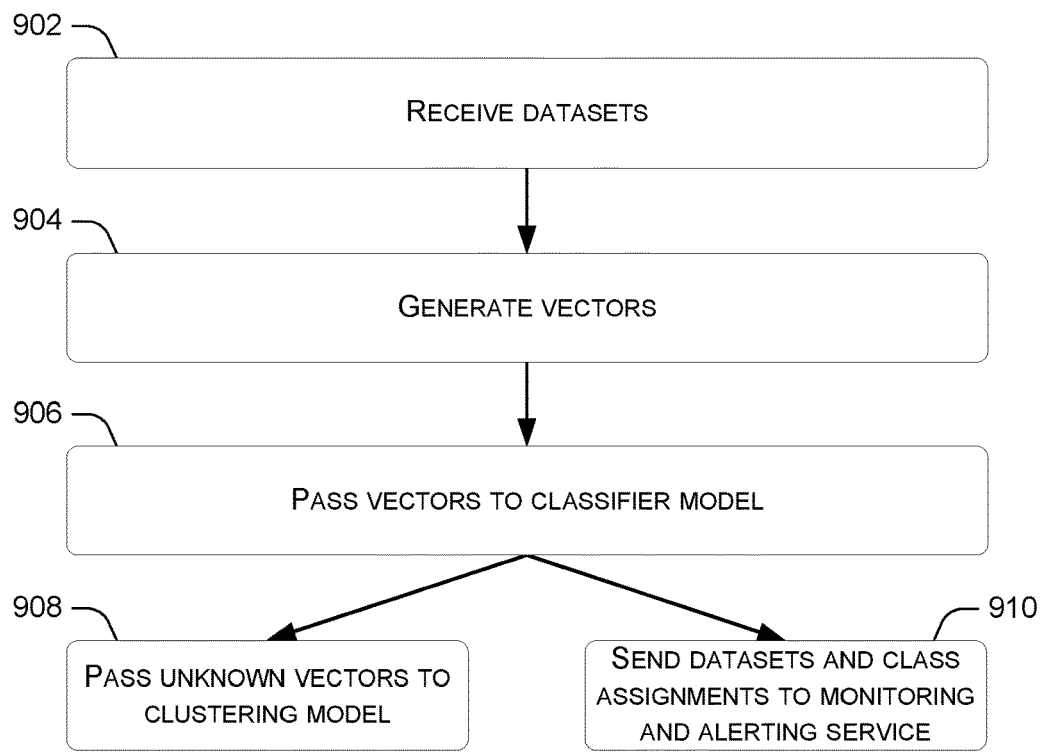
FIG. 9 illustrates an example run-time method, consistent with some implementations of the present concepts.

FIG. 9 illustrates an example of a run-time method 900, consistent with some implementations of the present concepts. The acts in the run-time method 900 may be performed in the order presented, in a different order, or in parallel or simultaneously, or may be omitted.

In act 902, datasets may be received. For example, feedback may be received from users through sources. User feedback may include free-form natural language in one or more formats, such as text, audio, video, etc. Then, the feedback may be converted into verbatims that include text extracted from the feedback. In some implementations, the feedback may be translated and/or PII may be scrubbed from the feedback, such that the datasets are in one language and devoid of PII.

In act 904, vectors corresponding to the datasets may be generated. For example, the embeddings learned through the training method 600 above may be used to generate the vectors in the run-time method 900.

In act 906, the vectors generated in act 906 may be passed into a classifier model to determine their class associations (or to suggest class assignments for the verbatims corresponding to the vectors). For instance, the classifier model trained through the training method 600 above may be used in the run-time method 900 to attempt to classify the verbatims into one or more of the set of classes.

The output of the classifier model may be a set of suggestion classes for each of the datasets. That is, the classifier model may assign one class to a particular dataset, multiple classes to a particular dataset, or no classes to a particular dataset. For example, a verbatim that relates to multiple topics may be suggested to be assigned to multiple classes by the classifier, a verbatim that relates to one topic may be suggested to be assigned to one class by the classifier, and a verbatim that does not relate to any of the known topics may be suggested to be assigned to an unknown class by the classifier.

In act 908, a subset of the vectors assigned to the unknown class in act 906 may be passed into a clustering model to perform clustering on such vectors. This clustering may form groups of similar vectors, which an SME can evaluate to determine if there is a new class that is trending and worth tracking in the future or if there are new example expressions of an existing class. In the former scenario, where the SME identifies a new topic, the SME may add a new class to the taxonomy of existing classes along with the new datasets as seed datasets for the new class. Accordingly, the classifier model can be trained to identify datasets related to the new class in the future. In the latter scenario, where the SME identifies new examples of an existing class, the SME may add the new example datasets as additional seed datasets belonging to the existing class. This addition may assist the classifier model to better identify future datasets that relate to this class.

In act 910, the datasets along with their class assignments according to the classifier model may be sent to a monitoring and alerting service. The monitoring and alerting service may keep track of the number of datasets for each of the classes detected within certain time periods. Therefore, the service may provide a dashboard of the current status, detect trending classes (whether trending upwards or downwards), and alert appropriate people.

The present concepts may enable gaining valuable insight into customer feedback and detecting customers experiencing certain issues or problems. Example verbatims relating to specific topics may be easily added or removed to improve topic accuracy without the need for model retraining or data science support. For example, new seed verbatims may be added without updating the embeddings. The present concepts may provide the ability to easily provide example verbatims of a topic and then find other verbatims relating to the same topic. The present concepts may leverage a domain-tuned natural language model to classify verbatims of unknown topic with a high degree of accuracy in order to improve classifying based on known topics and identifying new emerging topics. Therefore, the present concepts support the ability to detect insights from user feedback.

Figure 10:
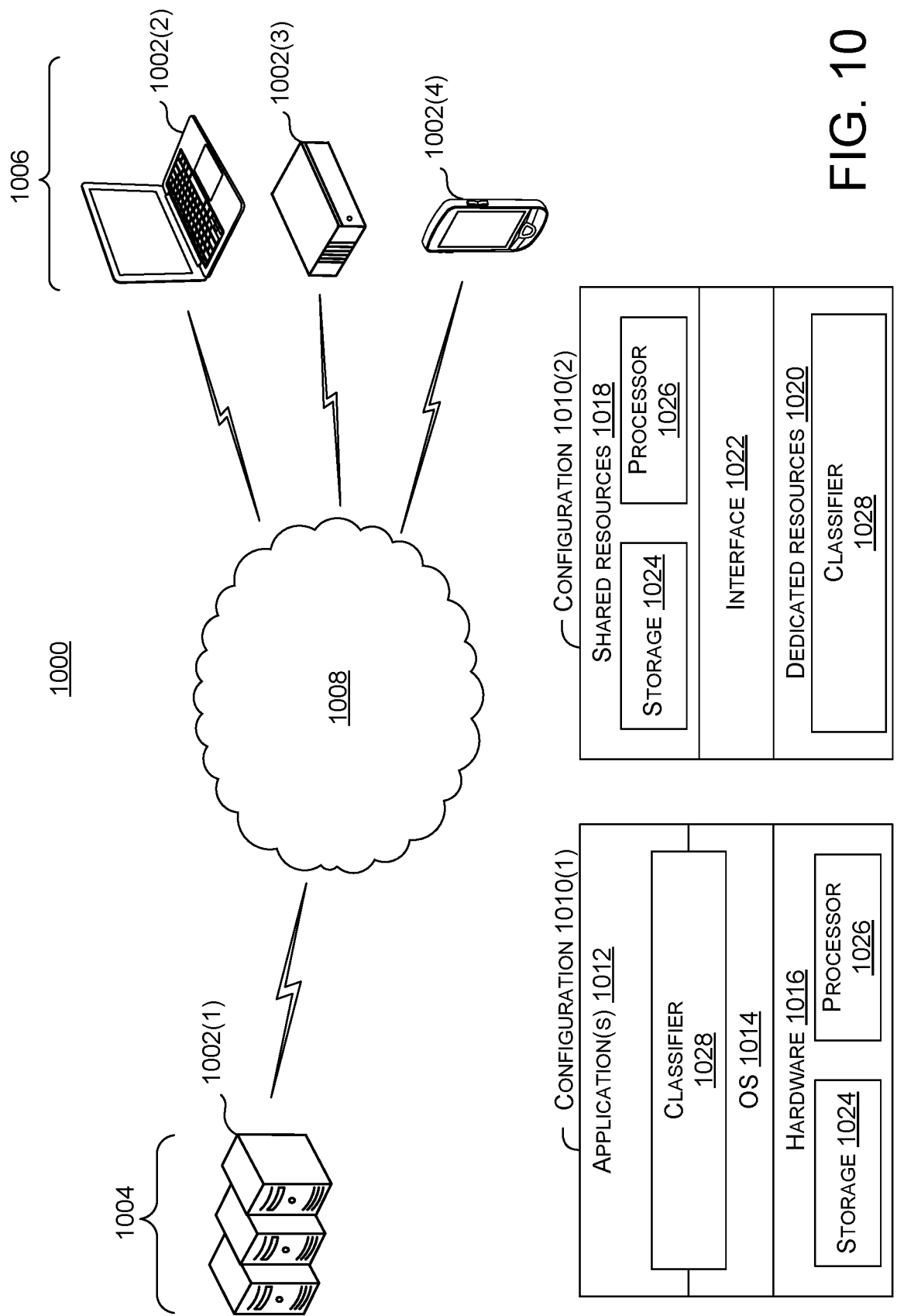
FIG. 10 illustrates an example system, consistent with some implementations of the present concepts.

FIG. 10 shows an example of a system 1000, consistent with some implementations of the present concepts. For purposes of explanation, the system 1000 may include devices 1002. Examples of devices 1002 can include personal computers, desktop computers, servers, notebook computers, cellular phones, smartphones, personal digital assistants, tablets or pad type computers, mobile computers, cameras, appliances, virtual reality headsets, video game consoles, controllers, smart devices, IoT devices, vehicles, watches, wearables, set-top boxes, game systems, automobile entertainment or navigation consoles, etc., and/or any of a myriad of ever-evolving or yet to be developed types of electronic devices.

In the example shown in FIG. 10, the devices 1002 may include a server device 1002(1) (or a collection of servers), a laptop 1002(2), a game system 1002(3), and a smartphone 1002(4). For purposes of explanation, device 1002(1) can be viewed as being a server-side device 1004 (or cloud-based resource), and devices 1002(2)-1002(4) can be viewed as being client-side devices 1006 (or client devices). The number of the 1002 and the client-versus-server side of the devices 1002 described and depicted are intended to be illustrative and non-limiting. The devices 1002 can communicate with one another via one or more networks 1008 and/or can access the Internet over the one or more networks 1008.

The term "device," "computer," or "computing device" as used herein can mean any type of device that has some amount of processing capability and/or storage capability. Processing capability can be provided by one or more hardware processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, optical storage devices (e.g., CDs, DVDs etc.), and/or remote storage (e.g., cloud-based storage), among others. As used herein, the term "computer-readable media" can include transitory propagating signals. In contrast, the term "computer-readable storage media" excludes transitory propagating signals. Computer-readable storage media may include computer-readable storage devices. Examples of computer-readable storage devices may include volatile storage media, such as RAM, and non-volatile storage media, such as hard drives, optical discs, and flash memory, among others.

In some implementations, the server-side devices 1004, the client-side devices 1006, and/or a combination may perform all or parts of the training method 600 and/or of the run-time method 900, as well as other acts described herein. For example, users may provide feedback using one or more of the client-side devices 1006. One or more of the server-side devices 1004 may train and host a classifier model 1028, consistent with the present concepts. The server-side devices 1004 may receive feedback from users and run the classifier model 1028 to obtain insight from the feedback (i.e., determine the relevant topics relating to the feedback). The client-side devices 1006 may present information about verbatims, new topics, or trending topics to SMEs.

FIG. 10 shows two example device configurations 1010(1) and 1010(2) that can be employed by any or all of the devices 1002. Individual devices 1002 can employ either of the configurations 1010(1) or 1010(2), or an alternate configuration. One instance of each configuration 1010 is illustrated in FIG. 10. The configuration 1010(1) may represent an operating system (OS) centric configuration. The configuration 1010(2) may represent a system-on-chip (SoC) configuration. The configuration 1010(1) can be organized into one or more applications 1012, operating system 1014, and hardware 1016. The configuration 1010(2) may be organized into shared resources 1018, dedicated resources 1020, and an interface 1022 there between.

In either configuration 1010, the device 1002 can include a storage 1024 and a processor 1026. The device 1002 can also include the classifier model 1028, consistent with the present concepts. For instance, the classifier model 1028 may be trained using the training method 600 described above or similar methods. The classifier model 1028 may be deployed during run time, for example, in accordance with the run-time method 900 descried above or similar methods. The output from the classifier model 1028 may be presented to a user in graphical form using a GUI, for example, by the client-side device 1006.

As mentioned above, the configuration 1010(2) can be thought of as an SoC type design. In such a case, functionality provided by the device 1002 can be integrated on a single SoC or multiple coupled SoCs. One or more processors 1026 can be configured to coordinate with shared resources 1018, such as storage 1024, etc., and/or one or more dedicated resources 1020, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" or "module" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component or module are platform-independent, meaning that they may be implemented on a variety of commercial computing platforms having a variety of processing configurations.

The system 1000 illustrated in FIG. 10 is merely one example. The system 1000 need not include all the example elements described in connection with FIG. 10, and the system 1000 may also include additional elements not explicitly described in connection with FIG. 10.

The present concepts have been described above using examples of text-based verbatims and gaming applications. However, the present concepts can be applied to other types of datasets and other applications, such as classifying audio, music, videos, movies, magazines, newspapers, images, etc. Furthermore, the present concepts may be used in scenarios where the taxonomy of classifications may evolve with time, so the classifier should be able to classify in the known taxonomy but also suggest potential new output classes. If all the output classes are not known but a subset of the classes are known, then the classifier can suggest how to augment the taxonomy of output classes.

Various examples are described above. Additional examples are described below.

Various device examples are described above. Additional examples are described below. One example includes a system comprising a storage for storing instructions and a processor for executing the instructions to receive raw verbatims, receive a set of topics, receive seed verbatims having definite labels associated with the set of topics, and repeat labeling epochs until a first condition is met. The labeling epochs including calculating seed vectors corresponding to the seed verbatims and raw vectors corresponding to the raw verbatims, using embeddings from a domain-trained natural language model, assigning pseudo labels to the raw verbatims based on distances between the raw vectors and the seed vectors, and repeating classification epochs until a second condition is met. The classification epochs including performing a seed classification task based on the seed verbatims, performing a pseudo classification task based on the raw verbatims, and updating the embeddings based on seed classification task and the pseudo classification task.

Another example can include any of the above and/or below examples where a particular pseudo label is assigned to a particular raw verbatim based on a distance that satisfies a distance threshold.

Another example can include any of the above and/or below examples where the seed vectors serve as centers of clusters formed during the classification epoch.

Another example can include any of the above and/or below examples where the embeddings are updated during the classification epoch due to back propagation.

Another example can include any of the above and/or below examples where a plurality of classification epochs is performed in one iteration of the labeling epoch.

Another example can include any of the above and/or below examples where the seed classification task is weighed more than the pseudo classification task when updating the embeddings.

Another example can include any of the above and/or below examples where the first condition is based on a normalized mutual information threshold and the second condition is based on a classification accuracy threshold.

Another example can include any of the above and/or below examples where the processor further executes the instructions to fine-tune a base natural language model using a corpus of domain-specific text to generate the domain-trained natural language model.

Another example includes a computer-readable storage medium storing instructions which, when executed by a processor, cause the processor to obtain embeddings produced by a trained natural language model, receive topics and seed datasets having definite labels associated with the topics, receive raw datasets, (A) generate seed vectors corresponding to the seed datasets and raw vectors corresponding to the raw datasets based on the embeddings, (B) assign pseudo labels associated with the topics to the raw datasets based on distances between the raw vectors and the seed vectors and based on a distance threshold, (C) update the embeddings by learning to classify the seed vectors based on the definite labels and by learning to classify the raw vectors based on the pseudo labels, (D) repeat (C) until a first condition is met, and repeat (A), (B), (C), and (D) until a second condition is met.

Another example can include any of the above and/or below examples where the definite labels of the seed datasets are weighed higher than the pseudo labels of the raw datasets when updating the embeddings.

Another example can include any of the above and/or below examples where (C) is repeated multiple times between two iterations of (A).

Another example includes a method for training a classifier comprising repeating labeling epochs including generating raw vectors corresponding to raw datasets and seed vectors corresponding to seed datasets, based on embeddings, assigning pseudo class labels to the raw datasets based on distances between the raw vectors and the seed vectors, and repeating classification epochs including updating the embeddings by performing classification tasks using the seed datasets and the raw datasets.

Another example can include any of the above and/or below examples where the method further comprises stop repeating the labeling epochs based on a normalized mutual information (NMI) threshold.

Another example can include any of the above and/or below examples where multiple classification epochs are performed for each labeling epoch.

Another example can include any of the above and/or below examples where the method further comprises stop repeating the classification epochs based on a classification accuracy threshold.

Another example can include any of the above and/or below examples where the classification tasks assume that the pseudo class labels are ground-truth labels.

Another example can include any of the above and/or below examples where the classification epochs further comprise performing back propagation.

Another example can include any of the above and/or below examples where the assigning further comprises calculating a shortest distance between a particular raw dataset and a closest seed dataset and comparing the shortest distances with a distance threshold.

Another example can include any of the above and/or below examples where the method further comprising assigning an unknown class label to a subset of the raw datasets and clustering the subset of the raw datasets.

Another example can include any of the above and/or below examples where the method further comprises receiving a new class and new seed datasets belonging to the new class and training the classifier to classify the new class.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A system comprising:
a storage storing instructions; and
a processor configured to execute the instructions to:
receive raw verbatims;
receive a set of topics;
receive seed verbatims having definite labels associated with the set of topics;
receive embeddings from a domain-trained natural language model; and
repeat one or more iterations of labeling epochs until a first condition is met, the labeling epochs including:
calculating seed vectors corresponding to the seed verbatims and raw vectors corresponding to the raw verbatims, using the embeddings;
assigning pseudo labels to the raw verbatims based on distances between the raw vectors and the seed vectors; and
repeating one or more iterations of classification epochs until a second condition is met, the classification epochs including:
performing a seed classification task on the seed vectors corresponding to the definite labels;
performing a pseudo classification task on the raw vectors corresponding to the pseudo labels which are assumed as ground-truth labels; and
updating the embeddings based on the seed classification task and the pseudo classification task.

2. The system of claim 1, wherein a particular pseudo label is assigned to a particular raw verbatim based on a distance that satisfies a distance threshold.

3. The system of claim 1, wherein the seed vectors corresponding to the definite labels serve as centers of clusters of the raw vectors corresponding to the pseudo labels formed during the one or more iterations of the classification epochs.

4. The system of claim 1, wherein the embeddings are updated during the one or more iterations of the classification epochs due to back propagation.

5. The system of claim 1, wherein multiple iterations of the classification epochs are performed in one iteration of the labeling epochs.

6. The system of claim 1, wherein the seed classification task is weighed more than the pseudo classification task when updating the embeddings.

7. The system of claim 1, wherein:
the first condition is based on a normalized mutual information threshold; and
the second condition is based on a classification accuracy threshold.

8. The system of claim 1, wherein the processor is further configured to execute the instructions to:
fine-tune a base natural language model using a corpus of domain-specific text to generate the domain-trained natural language model.

9. A computer-readable storage medium storing instructions which, when executed by a processor, cause the processor to:
obtain embeddings produced by a trained natural language model;
receive topics and seed datasets having definite labels associated with the topics;
receive raw datasets;
(A) generate seed vectors corresponding to the seed datasets and raw vectors corresponding to the raw datasets, based on the embeddings;
(B) assign pseudo labels associated with the topics to the raw datasets based on distances between the raw vectors and the seed vectors and based on a distance threshold;
(C) update the embeddings by learning to classify the seed vectors based on the definite labels and by learning to classify the raw vectors based on the pseudo labels which are assumed as ground-truth labels;
(D) repeat (C) until a first condition is met; and
repeat (A), (B), (C), and (D) until a second condition is met.

10. The computer-readable storage medium of claim 9, wherein the definite labels of the seed datasets are weighed higher than the pseudo labels of the raw datasets when updating the embeddings.

11. The computer-readable storage medium of claim 9, wherein (C) is repeated multiple iterations for one iteration of (A).

12. A method for training a classifier, comprising:
receiving embeddings produced from a natural language model;
receiving raw datasets and seed datasets; and
repeating one or more iterations of labeling epochs until a first condition is met, the labeling epochs including:
generating raw vectors corresponding to the raw datasets and seed vectors corresponding to the seed datasets, based on the embeddings;
assigning pseudo class labels to the raw datasets based on distances between the raw vectors and the seed vectors; and
repeating one or more iterations of classification epochs until a second condition is met, the classification epochs including:
updating the embeddings by performing classification tasks using the seed vectors and the raw vectors corresponding to the pseudo class labels which are assumed as ground-truth labels.

13. The method of claim 12, further comprising:
stop repeating the labeling epochs if the first condition based on a normalized mutual information (NMI) threshold is met.

14. The method of claim 12, wherein multiple iterations of the classification epochs are performed for one iteration of the labeling epochs.

15. The method of claim 12, further comprising:
stop repeating the classification epochs if the second condition based on a classification accuracy threshold is met.

16. The method of claim 12, wherein the classification tasks temporarily assume that the pseudo class labels currently corresponding to the seed vectors at each iteration of the classification epochs are ground-truth labels.

17. The method of claim 12, wherein the classification epochs further comprise:
performing back propagation based on the classification tasks to update the embeddings.

18. The method of claim 12, wherein the assigning further comprises:
calculating a shortest distance between a particular raw vector and a closest seed vector; and comparing the shortest distances with a distance threshold.

19. The method of claim 12, further comprising:

assigning an unknown class label to a subset of the raw datasets whose corresponding raw vectors are greater than a threshold distance away from the seed vectors; and clustering the subset of the raw datasets.

20. The method of claim 12, further comprising:

receiving a new class and new seed datasets belonging to the new class; and training the classifier to classify the new class.

* * * * *